United States Patent
Hwang et al.

(10) Patent No.: US 11,132,775 B2
(45) Date of Patent: Sep. 28, 2021

(54) IMAGE PROCESSING APPARATUS AND METHOD OF OPERATING THE SAME

(71) Applicant: SAMSUNG ELECTRONICS CO., LTD., Suwon-si (KR)

(72) Inventors: Chanyoung Hwang, Suwon-si (KR); Wonjae Lee, Suwon-si (KR); Insang Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 122 days.

(21) Appl. No.: 16/529,942

(22) Filed: Aug. 2, 2019

(65) Prior Publication Data
US 2020/0160494 A1    May 21, 2020

(30) Foreign Application Priority Data

Nov. 16, 2018    (KR) .................. 10-2018-0141951

(51) Int. Cl.
*G06T 5/50*        (2006.01)
*G06F 17/15*     (2006.01)
*G06N 3/04*       (2006.01)

(52) U.S. Cl.
CPC .............. *G06T 5/50* (2013.01); *G06F 17/15* (2013.01); *G06N 3/0454* (2013.01)

(58) Field of Classification Search
CPC combination set(s) only.
See application file for complete search history.

(56) References Cited

U.S. PATENT DOCUMENTS

| 5,295,227 | A  | * | 3/1994 | Yokono | G06K 9/62 706/28 |
|---|---|---|---|---|---|
| 9,922,432 | B1 | * | 3/2018 | Risser | G06T 11/00 |
| 2017/0092265 | A1 |  | 3/2017 | Saimath et al. | |
| 2017/0262598 | A1 | * | 9/2017 | Petkov | G06T 15/06 |
| 2018/0032846 | A1 |  | 2/2018 | Yang et al. | |
| 2018/0075343 | A1 | * | 3/2018 | van den Oord | G06N 3/0472 |
| 2018/0189643 | A1 |  | 7/2018 | Kim et al. | |
| 2018/0260687 | A1 | * | 9/2018 | Kanno | G06N 3/0454 |
| 2018/0293707 | A1 | * | 10/2018 | El-Khamy | G06N 3/0454 |
| 2019/0026870 | A1 | * | 1/2019 | Hu | G06T 11/00 |

(Continued)

FOREIGN PATENT DOCUMENTS

WO    2018071546 A1    4/2018

OTHER PUBLICATIONS

Justin Johnson et al., "Perceptual Losses for Real-Time Style Transfer and Super-Resolution", Stanford University, Mar. 27, 2016, 17 pages.

(Continued)

*Primary Examiner* — Omar S Ismail
(74) *Attorney, Agent, or Firm* — Sughrue Mion, PLLC

(57) ABSTRACT

An image processing apparatus processes an image by using one or more neural networks, and includes a memory storing one or more instructions and data structures for a main neural network and a sub-neural network, and a processor configured to execute the one or more instructions stored in the memory to process an input image by using the main neural network to obtain intermediate result data and a final output image, and to process the intermediate result data by using the sub-neural network to output an intermediate image while the input image is being processed by using the main neural network.

21 Claims, 16 Drawing Sheets

(56) References Cited

U.S. PATENT DOCUMENTS

2019/0066733 A1* 2/2019 Somanath ............. G06T 3/4046
2019/0311493 A1* 10/2019 Hillborg ............... G06K 9/3216
2020/0082264 A1* 3/2020 Guo ........................ G06N 3/08

OTHER PUBLICATIONS

International Search Report and Written Opinion (PCT/ISA/210 and PCT/ISA/237), dated Oct. 25, 2019 by International Searching Authority in International Application No. PCT/KR2019/009298.

* cited by examiner

FIG. 6
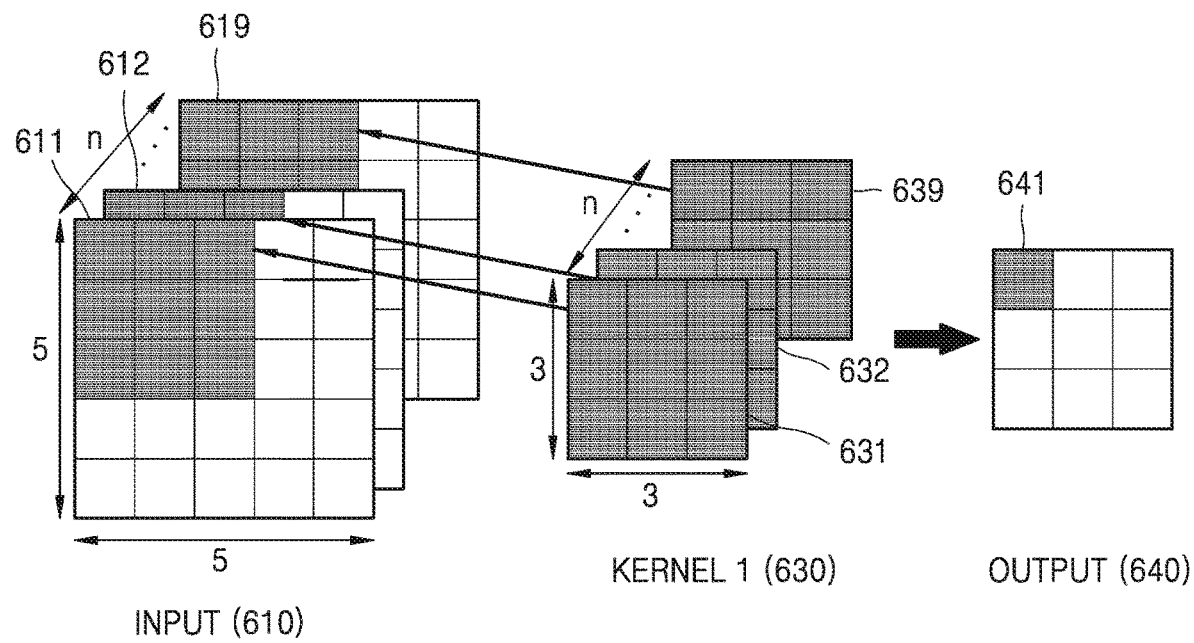
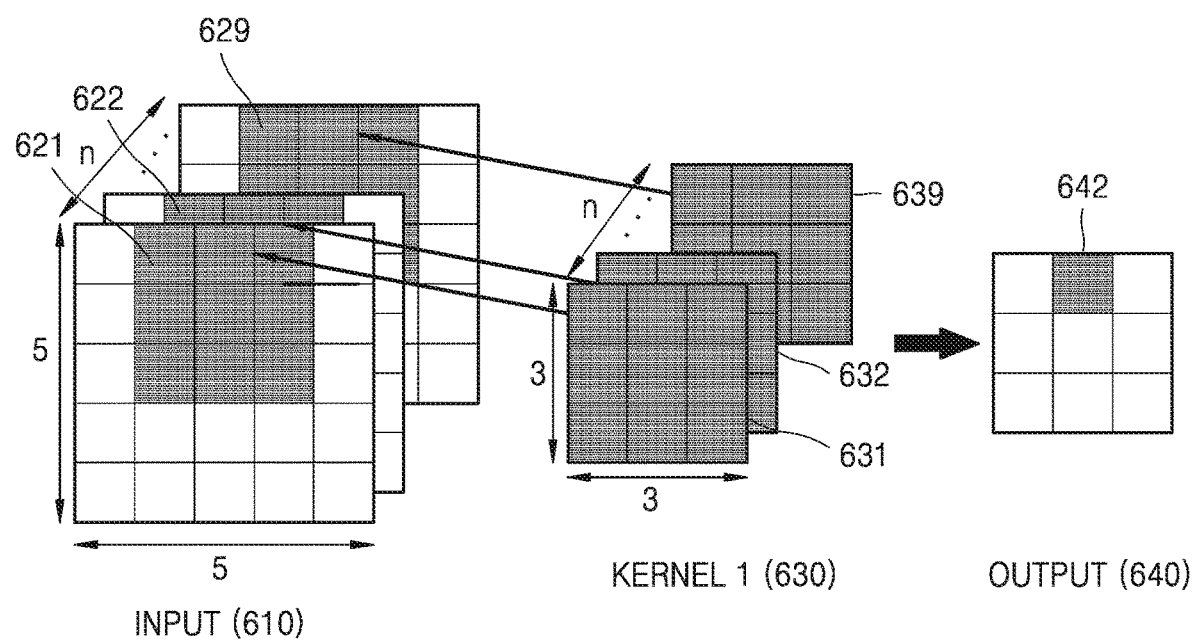

IMAGE PROCESSING APPARATUS AND METHOD OF OPERATING THE SAME

CROSS-REFERENCE TO RELATED APPLICATION(S)

This application is based on and claims priority under 35 U.S.C. § 119 to Korean Patent Application No. 10-2018-0141951, filed on Nov. 16, 2018, in the Korean Intellectual Property Office, the disclosure of which is incorporated by reference herein in its entirety.

BACKGROUND

1. Field

The disclosure relates to image processing apparatuses and methods of operating the same, and more particularly, to an image processing apparatus that processes an input image by using a neural network including a plurality of convolution layers, and a method of operating the image processing apparatus.

2. Description of Related Art

Artificial intelligence (AI) systems are computer systems configured to realize human-level intelligence and train themselves and make determinations spontaneously to become smarter, in contrast to existing rule-based smart systems. Because recognition rates of AI systems improve and the AI systems more accurately understand a user's preferences the more they are used, existing rule-based smart systems are being gradually replaced by deep-learning AI systems.

AI technology includes machine learning (e.g., deep learning) and element technologies employing the machine learning. Machine learning is an algorithm technology that self-classifies/learns the characteristics of input data, and uses a machine learning algorithm, such as deep learning, and includes technical fields, such as linguistic understanding, visual understanding, deduction/prediction, knowledge representation, and operation control.

Various fields to which AI technology is applied are as follows. Linguistic understanding is a technique of recognizing a language/character of a human and applying/processing the language/character of a human, and includes natural language processing, machine translation, a conversation system, questions and answers, voice recognition/synthesis, and the like. Visual understanding is a technique of recognizing and processing an object like in human vision, and includes object recognition, object tracking, image search, human recognition, scene understanding, space understanding, image improvement, and the like. Deduction/prediction is a technology of logically performing deduction and prediction by determining information, and includes knowledge/probability-based deduction, optimization prediction, a preference-based plan, recommendation, and the like. Knowledge representation is a technique of automatically processing human experience information as knowledge data, and includes knowledge establishment (data generation/classification), knowledge management (data utilization), and the like. Operation control is a technique of controlling autonomous driving of a vehicle and motions of a robot, and includes motion control (navigation, collision avoidance, and driving), manipulation control (behavior control), and the like.

SUMMARY

Provided are an image processing apparatus capable of generating an intermediate output image by using a main neural network and a sub-neural network, and a method of operating the image processing apparatus.

Additional aspects will be set forth in part in the description which follows and, in part, will be apparent from the description, or may be learned by practice of the presented embodiments of the disclosure.

According to an embodiment of the disclosure, an image processing apparatus may include: a memory storing one or more instructions and data structures for a main neural network and a sub-neural network; and a processor configured to execute the one or more instructions stored in the memory to process an input image by using the main neural network to obtain intermediate result data and a final output image, and process the intermediate result data by using the sub-neural network to output an intermediate image while the input image is being processed by using the main neural network to obtain the final output image.

The main neural network may include a plurality of first convolution layers, and the processor may be further configured to perform a first convolution operation on the input image by using one or more kernels within the plurality of first convolution layers to extract feature information and generate the intermediate result data based on the extracted feature information.

The sub-neural network may include one or more second convolution layers, and the processor may be further configured to perform a second convolution operation by applying one or more kernels to the intermediate result data within the one or more second convolution layers to extract feature information and output the intermediate image based on the extracted feature information.

The main neural network may be a network trained to generate the final output image by applying a preset style to the input image, and a degree to which the preset style has been applied to the intermediate image may be less than a degree to which the preset style has been applied to the final output image.

A first time period taken to generate the final output image from the input image by using the main neural network may be greater than a second time period taken to generate the intermediate image from the input image by using the sub-neural network.

The processor may be further configured to predict the first time period and the second time period and determine whether to generate the intermediate image by using the sub-neural network, based on the predicted first time period and the predicted second time period.

The image processing apparatus may further include a display, wherein the processor is further configured to control the display to display a time period taken to generate at least one of the intermediate image or the final output image from a current time point.

The processor may be further configured to stop processing of the input image before the final output image is generated, based on a user input.

The main neural network may include an input layer, an output layer, a plurality of first convolution layers located between the input layer and the output layer, and at least one intermediate output layer located between two sequential convolution layers of the plurality of first convolution layers. The processor may be further configured to transmit the intermediate result data to the sub-neural network through the at least one intermediate output layer while processing the input image to obtain the final output image through the plurality of first convolution layers.

According to another embodiment of the disclosure, an image processing apparatus may include: a communication interface configured to receive intermediate result data from a server comprising a main neural network while the server is processing an input image by using the main neural network; a memory storing one or more instructions and a data structure for a sub-neural network; and a processor configured to execute the one or more instructions stored in the memory to output an intermediate image by processing the intermediate result data based on the sub-neural network.

The main neural network may include an input layer, an output layer, a plurality of first convolution layers located between the input layer and the output layer, and at least one intermediate output layer located between two sequential convolution layers of the plurality of first convolution layers. The processor may be further configured to cause the sub-neural network to receive the intermediate result data from the at least one intermediate output layer of the main neural network while the input image is being processed through the plurality of first convolution layers of the main neural network.

According to another embodiment of the disclosure, a method of operating an image processing apparatus may include: processing an input image by using a main neural network; obtaining intermediate result data from the input image by using the main neural network while processing the input image to obtain a final output image; and generating an intermediate image based on the intermediate result data by using a sub-neural network.

The main neural network may include a plurality of first convolution layers, the processing the input image by using the main neural network may include extracting feature information by performing a first convolution operation on the input image and one or more kernels in the plurality of first convolution layers, and the obtaining the intermediate result data may include generating the intermediate result data, based on the extracted feature information.

The sub-neural network may include one or more second convolution layers, and the generating the intermediate image may include: extracting feature information by performing a second convolution operation by applying the intermediate result data to one or more kernels in the one or more second convolution layers; and generating the intermediate image, based on the extracted feature information.

The main neural network may be a network trained to generate the final image by applying a preset style to the input image, and a degree to which the preset style has been applied to the intermediate image may be less than a degree to which the preset style has been applied to the final output image.

A first time period taken to generate the final output image from the input image by using the main neural network may be greater than a second time period taken to generate the intermediate image from the input image by using the sub-neural network.

The method may further include: predicting the first time period and the second time period; and determining whether to generate the intermediate image by using the sub-neural network, based on the predicted first time period and the predicted second time period.

The method may further include displaying, on a display, a time period taken to generate at least one of the intermediate image or the final output image from a current time point.

The method may further include stopping the main neural network from processing the input image, before the final output image is generated, based on a user input.

According to another embodiment of the disclosure, a computer program product including a non-transitory computer-readable recording medium having recorded thereon a computer program, which, when executed by a computer, may perform the method of operating the image processing apparatus.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a diagram used to describe a process in which the first convolution layer of FIG. 5 performs a convolution operation;

DETAILED DESCRIPTION

Figure 1:
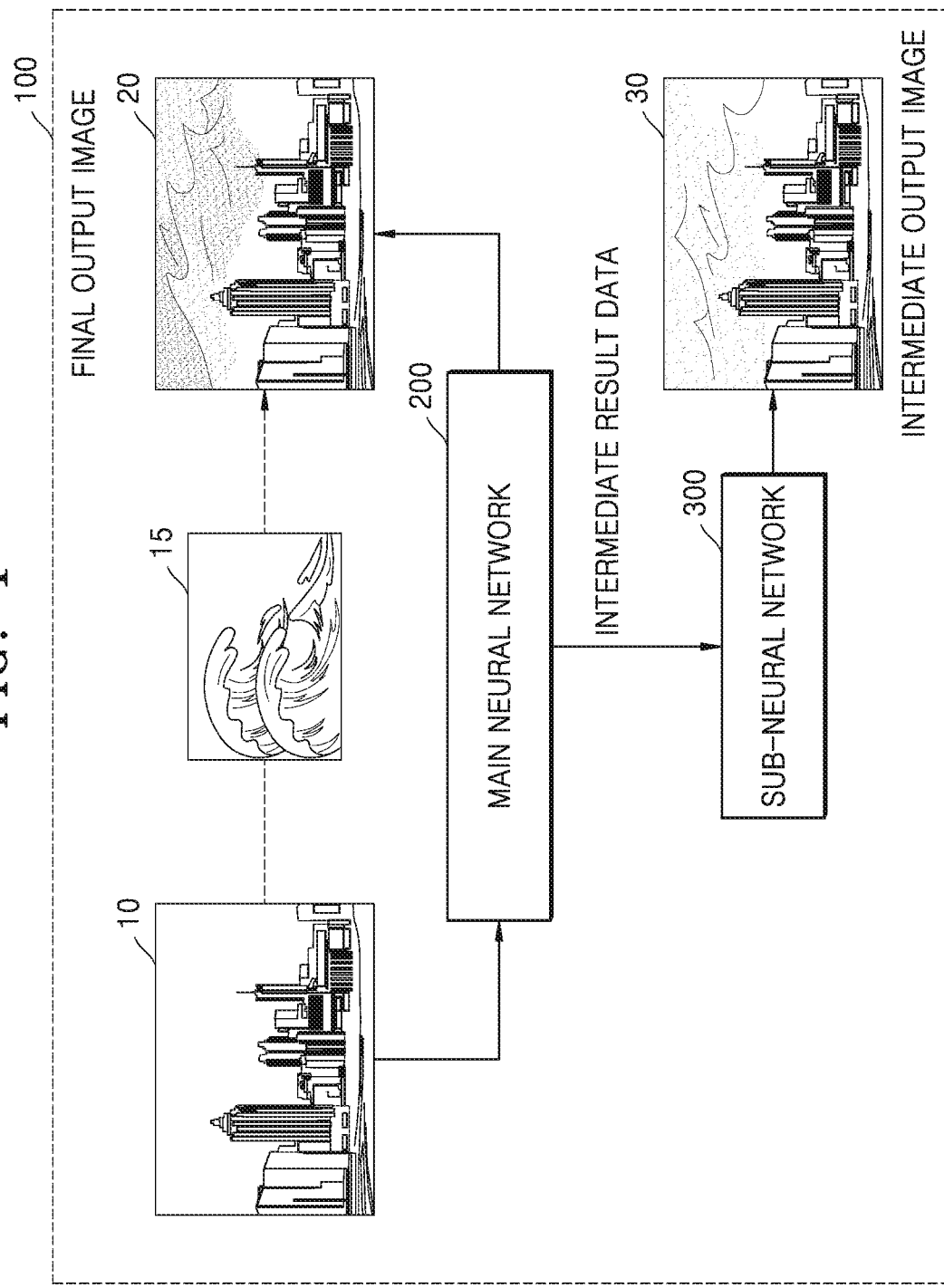
FIG. 1 illustrates a process in which an image processing apparatus according to an embodiment processes an image by using a main neural network and a sub-neural network.

Throughout the disclosure, the expression "at least one of a, b or c" indicates only a, only b, only c, both a and b, both a and c, both b and c, all of a, b, and c, or variations thereof.

Hereinafter, the terms used in the specification will be briefly described, and then the disclosure will be described in detail.

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

Embodiments of the disclosure are described in detail herein with reference to the accompanying drawings so that this disclosure may be easily performed by one of ordinary skill in the art to which the disclosure pertain. The disclosure may, however, be embodied in many different forms and should not be construed as being limited to the embodiments set forth herein. In the drawings, parts irrelevant to the description are omitted for simplicity of explanation, and like numbers refer to like elements throughout.

FIG. 1 illustrates a process in which an image processing apparatus 100 according to an embodiment of the disclosure processes an image by using a main neural network and a sub-neural network.

The image processing apparatus 100 may be any type of electronic device, such as a mobile phone, a tablet personal computer (PC), a digital camera, a camcorder, a laptop computer, a desktop computer, an e-book terminal, a digital broadcast terminal, a personal digital assistant (PDA), a portable multimedia player (PMP), a navigation device, an MP3 player, or a wearable device.

The image processing apparatus 100 may be implemented by using an image display apparatus including a display. In particular, embodiments of the image processing apparatus 100 may be easily implemented in an image display apparatus having a large display, such as a TV. However, embodiments of the disclosure are not limited thereto. For example, the image processing apparatus 100 may be stationary or mobile, or a digital broadcast receiver. The image processing apparatus 100 may be implemented by using not only a flat display apparatus but also a curved display apparatus having a curvature or a flexible display apparatus with an adjustable curvature. An output resolution of the image processing apparatus 100 may be, for example, high definition (HD), full HD, ultra HD, or a resolution that is clearer than ultra HD.

The term "user" used herein denotes a person who controls a function or operation of an image processing apparatus. Examples of the user may include a manager and an installation engineer.

The image processing apparatus 100 may include a main neural network 200 trained to process an image according to a preset purpose. The main neural network 200 may include, but is not limited to, a plurality of convolution layers.

For example, the main neural network 200 may be a model trained to output a style-transferred image 20 by applying a preset style 15 to an input image 10. In this case, a style may be determined according to lines, colors, materials, and atmospheres that appear on an image, but embodiments of the disclosure are not limited thereto.

The image processing apparatus 100 may process the input image e.g., a first image) 10 by using the main neural network 200 to obtain a final output image (e.g., a second image) 20. The image processing apparatus 100 may obtain intermediate result data that is output while the input image 10 is being processed and may input the intermediate result data to a sub-neural network 300. The image processing apparatus 100 may process the intermediate result data by using the sub-neural network 300 to generate an intermediate image (e.g., a third image). The sub-neural network 300 may include, but is not limited to, one or more convolution layers.

The image processing apparatus 100 may obtain an intermediate output image 30 different from the final output image 20, by processing the intermediate result data by using the sub-neural network 300.

When processing an image by using a single network, the image processing apparatus 100 may obtain the intermediate output image 30 by using the intermediate result data, before obtaining the final output image 20.

Accordingly, the image processing apparatus 100 may obtain the intermediate output image 30 before the final output image is generated, and, from a viewpoint of a user of the image processing apparatus 100, may reduce a standby time until the final output image 20 is generated.

Figure 2:
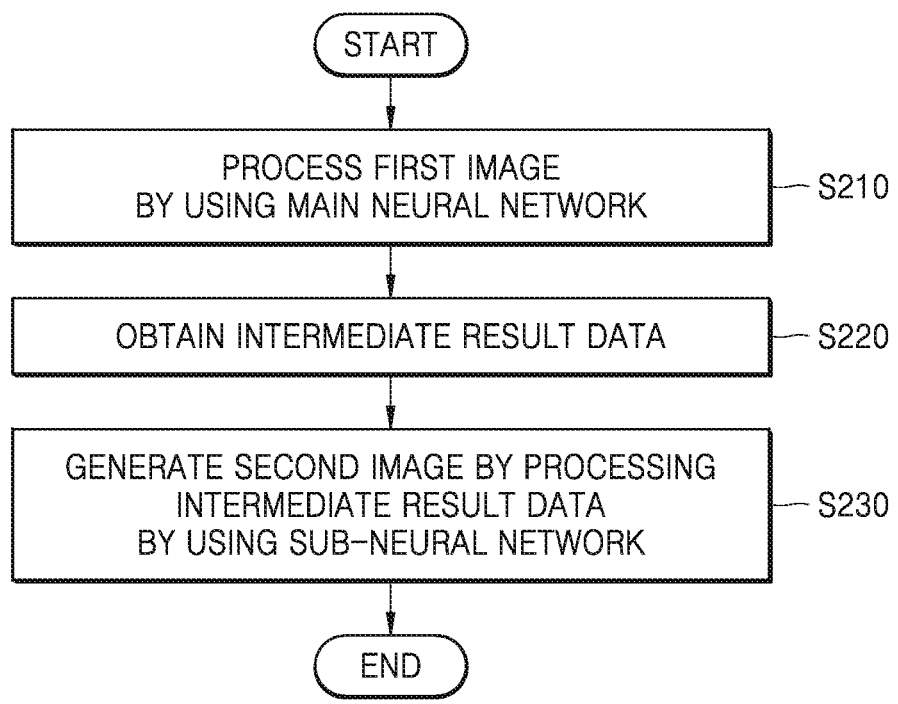
FIG. 2 is a flowchart of a method of operating an image processing apparatus, according to an embodiment of the disclosure.

FIG. 2 is a flowchart of a method of operating the image processing apparatus 100, according to an embodiment of the disclosure.

Referring to FIG. 2, in operation S210, the image processing apparatus 100 may process a first image by using a main neural network.

The main neural network according to an embodiment of the disclosure may be a model trained to process an image according to a preset purpose. The main neural network may be a convolutional neural network (CNN) including a plurality of convolution layers. For example, the main neural network may be a model trained to output a style-transferred image by applying a preset style to an input image. Alternatively, the main neural network may be a model trained to transform an input low-resolution image into a high-resolution image and output the high-resolution image. However, embodiments of the disclosure are not limited thereto.

The image processing apparatus 100 may obtain a final output image by processing the input first image by using the main neural network.

In operation S220, the image processing apparatus 100 may obtain intermediate result data that is output while the first image is being processed.

The image processing apparatus 100 may obtain data having passed through some of the convolution layers included in the main neural network.

In operation S230, the image processing apparatus 100 may generate a second image by processing the intermediate result data by using a sub-neural network.

The image processing apparatus 100 may process the intermediate result data by using the sub-neural network to obtain an intermediate output image (e.g., the third image) different from the final output image (e.g., the second image). In this case, when the main neural network is a model trained to apply a preset style, a degree to which the preset style has been applied in the final output image may be different from a degree to which the preset style has been applied in the intermediate output image. For example, the degree to which the preset style has been applied in the intermediate output image may be less than the degree to which the preset style has been applied in the final output image. However, embodiments of the disclosure are not limited thereto.

Figure 3:
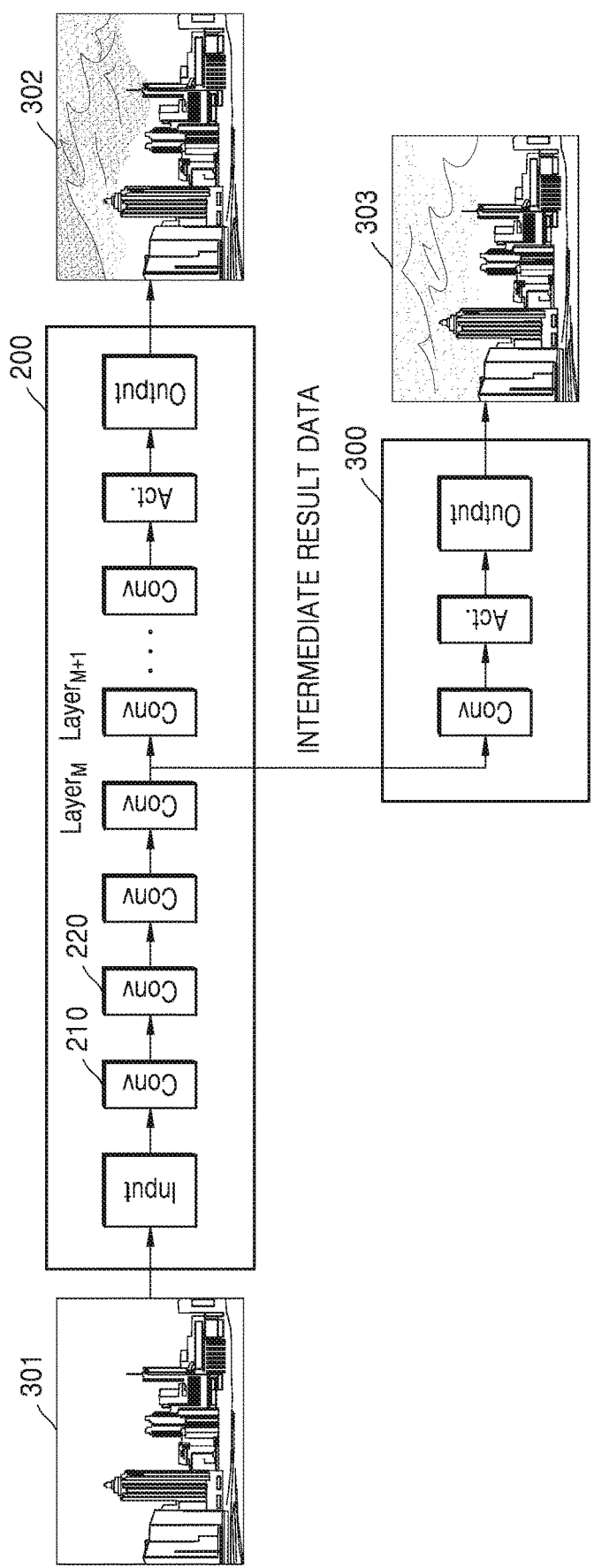
FIG. 3 is a diagram used to explain a method in which an image processing apparatus according to an embodiment of the disclosure processes an image by using a main neural network and a sub-neural network.

FIG. 3 is a diagram used to explain a method, performed by the image processing apparatus 100 according to an embodiment of the disclosure, of processing an image by using a main neural network and a sub-neural network.

Referring to FIG. 3, the image processing apparatus 100 may include a main neural network 200 and a sub-neural network 300.

The main neural network 200 may be a model trained to receive a first image and process the input first image according to a preset purpose to output a second image. For example, as illustrated in FIG. 3, the main neural network 200 may be a model trained to output a style-transferred image 302 by applying a preset style to an input image 301. However, being trained for the purpose of style transfer is merely an example, and the main neural network 200 may be a model trained for various purposes.

The main neural network 200 may have a structure in which data (e.g., image data) is input and processed while passing through hidden layers and thus processed data is output. The main neural network 200 may be a deep neural network (DNN) including two or more hidden layers 210, 220. For example, the main neural network 200 may be a CNN including a plurality of convolution layers.

The sub-neural network 300 may receive intermediate result data output from the main neural network 200, and process the intermediate result data according to a preset purpose to output a third image 303. For example, the sub-neural network 300 has a structure in which the intermediate data is input and processed while passing through one or more convolution layers (hidden layers) and thus processed data 303 (e.g., the third image) is output.

Structures and operations of the main neural network 200 and the sub-neural network 300 will now be described in detail with reference to FIGS. 4 through 6.

Figure 4:
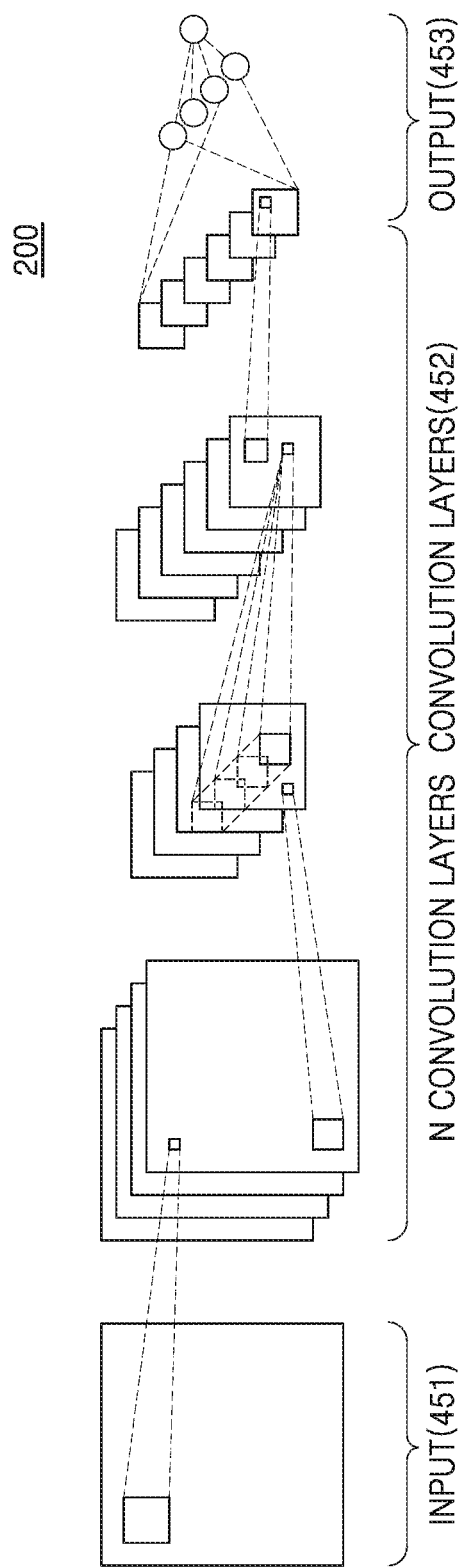
FIG. 4 is a diagram illustrating a structure of a main neural network according to an embodiment of the disclosure.

FIG. 4 illustrates a structure of the main neural network 200 according to an embodiment of the disclosure.

Referring to FIG. 4, the main neural network 200 may include an input layer, an output layer, and a plurality of hidden layers, such as N convolution layers 452 located between the input layer and the output layer. The main neural network 200 may receive input data 451 (e.g., a first image) through the input layer, and process the input data 451 through the N convolution layers 452 to generate output data 453 (e.g., a second image), and provide the output data 453 through the output layer. The main neural network 200 may be a deep convolutional neural network including two or more convolution layers. The main neural network 200 may further include pooling layers, fully connected layers, and normalization layers as the hidden layers.

The image processing apparatus 100 may extract "features" such as outlines, lines, and colors from the first image by using the main neural network 200. Each of the N convolution layers 452 included in the main neural network 200 may receive data, process the received data, and generate output data. For example, as shown in FIG. 3, the image processing apparatus 100 may generate a first feature map by convoluting an image (e.g., a first image) input to a first convolution layer 210 with one or more kernels or filters. The image processing apparatus 100 may also generate a second feature map by inputting the first feature map to a second convolution layer 220 and convoluting the first feature map input to the second convolution layer 220 with one or more kernels or filters. A convolution operation performed in a convolution layer will be described in greater detail with reference to FIGS. 4 through 6.

Front convolution layers of the main neural network 200 may operate to extract features of a low level, such as edges or gradients, from an input image. In a direction toward back convolution layers, the posterior convolution layers may extract gradually complicated features (e.g., an eye, a nose, a mouth, and a face).

One or more convolution layers that receive and output a feature map within the main neural network 200 may be hidden layers (e.g., hidden convolution layers). In the main neural network 200, processing operations other than an operation of performing convolution by applying one or more kernels to the feature map may be performed. For example, operations such as an activation function and pooling may be executed. The image processing apparatus 100 may apply an activation function in order to change values of a feature map extracted by performing a convolution operation to non-linear values such as "having or not having characteristics". Examples of the activation function may include a linear function in winch activation is proportional to input (i.e., a weighted sum from neuron), an Exponential Linear Unit (ELU) function consisting of two equations, $f(x)=x$ if $x≥0$ and $f(x)=\alpha(e^x-1)$ if $x<0$, a Rectified Linear Unit (ReLU) function that is defined as $y=\max(0, x)$, a Sigmoid function that takes a real value as input and outputs another value between 0 and 1 a Tanh function that squashes a real-valued number to the range from −1 to 1, and a Softmax function that calculates the probabilities of an event over n different events. The image processing apparatus 100 may perform sub-sampling (pooling) to reduce the size of the extracted feature map. In this case, max pooling, average pooling, L2-norm pooling, or the like may be used, but embodiments of the disclosure are not limited thereto.

For example, after the first image 301 (input data) passes through the N convolution layers of the main neural network 200, the first image 301 may undergo an operation, such as an activation function or pooling, and thus may be output as the second image 302.

Referring to FIG. 3, the main neural network 200 may include N convolution layers. In this case, the input image may be convoluted with one or more kernels within each of first through M-th convolution layers 210, 220, . . . , and 255 of the main neural network 200, and thus the intermediate result data may be output. The intermediate result data may be input to the sub-neural network 300.

The sub-neural network 300 may receive the intermediate result data from the main neural network 200. For example, the sub-neural network 300 includes an input layer to receive intermediate data, one or more convolution layers to process the intermediate result data, and an output layer to output the processed intermediate result data as output data (e.g., the third image 330).

The one or more convolution layers included in the sub-neural network 300 may be hidden layers (e.g., hidden convolution layers). The sub-neural network 300 may perform processing operations other than an operation of performing convolution by applying one or more kernels to a feature map. For example, operations such as an activation function and pooling may be executed. The image processing apparatus 100 may apply an activation function in order to change values of a feature map extracted by performing a convolution operation to non-linear values such as "having or not having characteristics". In this case, a tanh function or an ReLu function may be used, but embodiments of the disclosure are not limited thereto. The image processing apparatus 100 may perform sub-sampling (pooling) to reduce the size of the extracted feature map. In this case, max pooling, average pooling, L2-norm pooling, or the like may be used, but embodiments of the disclosure are not limited thereto.

For example, after the intermediate result data passes through the one or more convolution layers of the main neural network 200, the intermediate result data may undergo an operation such as an activation function or pooling, and thus may be output as the third image 330.

Figure 5:
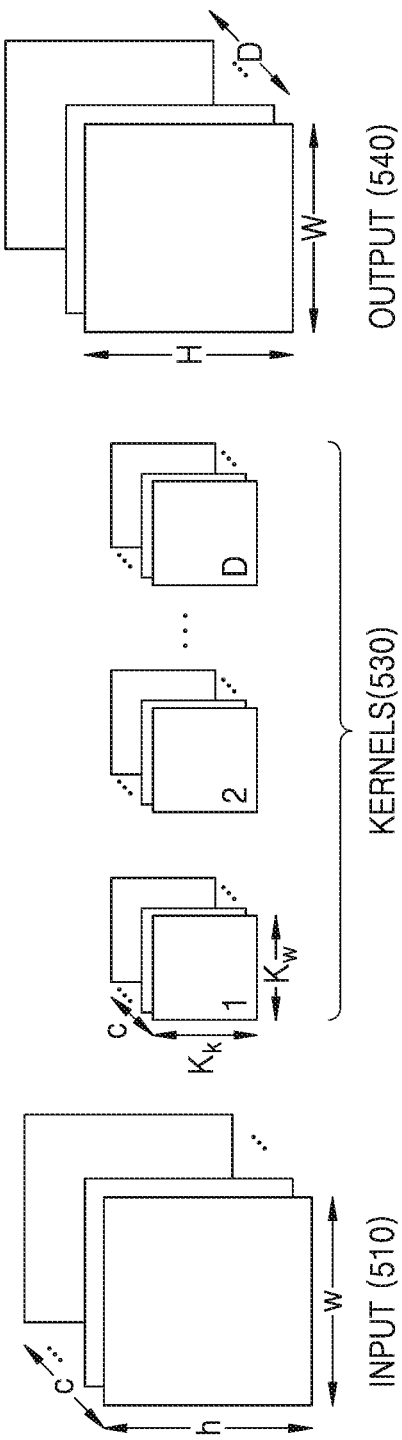
FIG. 5 illustrates input data, kernels, and output data of a first convolution layer included in a main neural network according to an embodiment of the disclosure.

FIG. 5 illustrates input data, kernels, and output data of a first convolution layer included in a main neural network according to an embodiment of the disclosure.

The main neural network 200 according to an embodiment of the disclosure may include N convolution layers 452 as shown in FIG. 4, and with reference to FIG. 5, a first convolution layer among the N convolution layers 452 will now be referred to as a first convolution layer Conv_1.

Input data 510 (e.g., first input data) in the first convolution layer Conv_1 may be a first image, and a size of the input data 510 may be w*h*C (i.e., width*height*channel), wherein w, h, and C denote width, height, and channel, respectively. For example, the first image may have a size of w*h, and the number of channels C may be, but is not limited to, 3 (e.g., R, G, and B). One or more kernels 530 (e.g., first kernels) in the first convolution layer Conv_1 may have a size of Kw*Kh, and the number of kernels may be C*D (i.e., the number of input channels*the number of output channels), wherein D denotes the number of output channels.

In the first convolution layer Conv_1, when a convolution operation with respect to the input data 510 and the first kernels 530 is performed, first output data 540 may be generated. In particular, the first output data 540 may include one or more feature maps, a size of the first output data 540 may be W*H*D, a size of one feature map may be W*H, and the number of features maps (or the number of channels) may be D.

FIG. 6 is a diagram used to describe a process in which the first convolution layer Conv_1 of FIG. 5 performs a convolution operation.

For convenience of explanation, it is assumed in FIG. 6 that input data 610 of the first convolution layer Conv_1 has a size of 5*5 and the number of channels is n. It is also assumed that a size of a kernel applied to the input data 610 is 3*3*n and the number of kernels is D. Herein, n is a depth of the kernel and thus has the same value as the number of channels of the input data 610. The number of channels of the input data 610 may be determined according to the number of kernels used by a layer prior to a current layer. In other words, it may be deemed that one kernel includes n sub-kernels 631, 632, . . . , and 639 each having a size of 3*3, and the n sub-kernels 631, 632, . . . , and 639 may correspond to n channels of the input data 610, respectively.

FIG. 6 illustrates a process of extracting a feature of the input data 610 by applying a first kernel 630 including n sub-kernels 631, 632, . . . , and 639 to from a left upper end of the input data 610 to a right lower end thereof. For example, a convolution operation may be performed by applying the first kernel 630 (3*3*n) to pixels included in left upper end (3*3*n) regions 611, 612, . . . , and 619 of the input data 610. In other words, the pixel values included in the left upper end (3*3*n) regions 611, 612, . . . , and 619 may be multiplied by weight values included in the first kernel 630 and summed, thereby generating a single pixel value 641 mapped with the left upper end (3*3*n) regions 611, 612, . . . , and 619.

In addition, the pixel values included in 3*3*n regions 621, 622, . . . , and 629 obtained by moving the left upper end (3*3*n) regions 611, 612, . . . , and 619 by one pixel rightwards may be multiplied by the weight values included in the first kernel 630 and summed, thereby generating a single pixel value 642 mapped with the 3*3*n regions 621, 622, . . . , and 629. Using the same method as described above, while a target of a convolution operation is being scanned in units of pixels in a direction from left to right and from top to bottom within the input data 610, the targets are multiplied by the weight values included in the first kernel 630 are multiplied and summed, and thus pixel values are generated. Thus, a 3*3 feature map 640 (output data) may be output. Data being the target of the convolution operation may be scanned while moving by one pixel at a time, but may be scanned while moving by two or more pixels at a time. The number of pixels by which input data moves during scanning is referred to as a stride, and the size of a feature map that is output may be determined according to the size of the stride.

Referring to FIG. 6, the input data 610 has a size of 5*5, but the output data 640 has a size of 3*3 that is less than that of the input data 610. A main neural network includes several convolution layers, and, while passing through the several convolution layers, the size of data continuously decreases. When the size of data decreases before a feature is sufficiently extracted, a feature of input data may be lost, and to prevent this, padding may be performed. The padding means increasing the size of the input data by giving a specific value (e.g., '0') to an edge of the output data in order to prevent output data from having a reduced size. However, embodiments of the disclosure are not limited thereto.

Although FIG. 6 illustrates only a result of a convolution operation with respect to the first kernel 630, when a convolution operation is performed on D kernels, a feature map of 3*3*D may be output. In other words, the number of channels of output data is determined according to the number D of kernels, and accordingly, the number of channels of input data in a next layer may be determined.

Figure 7:
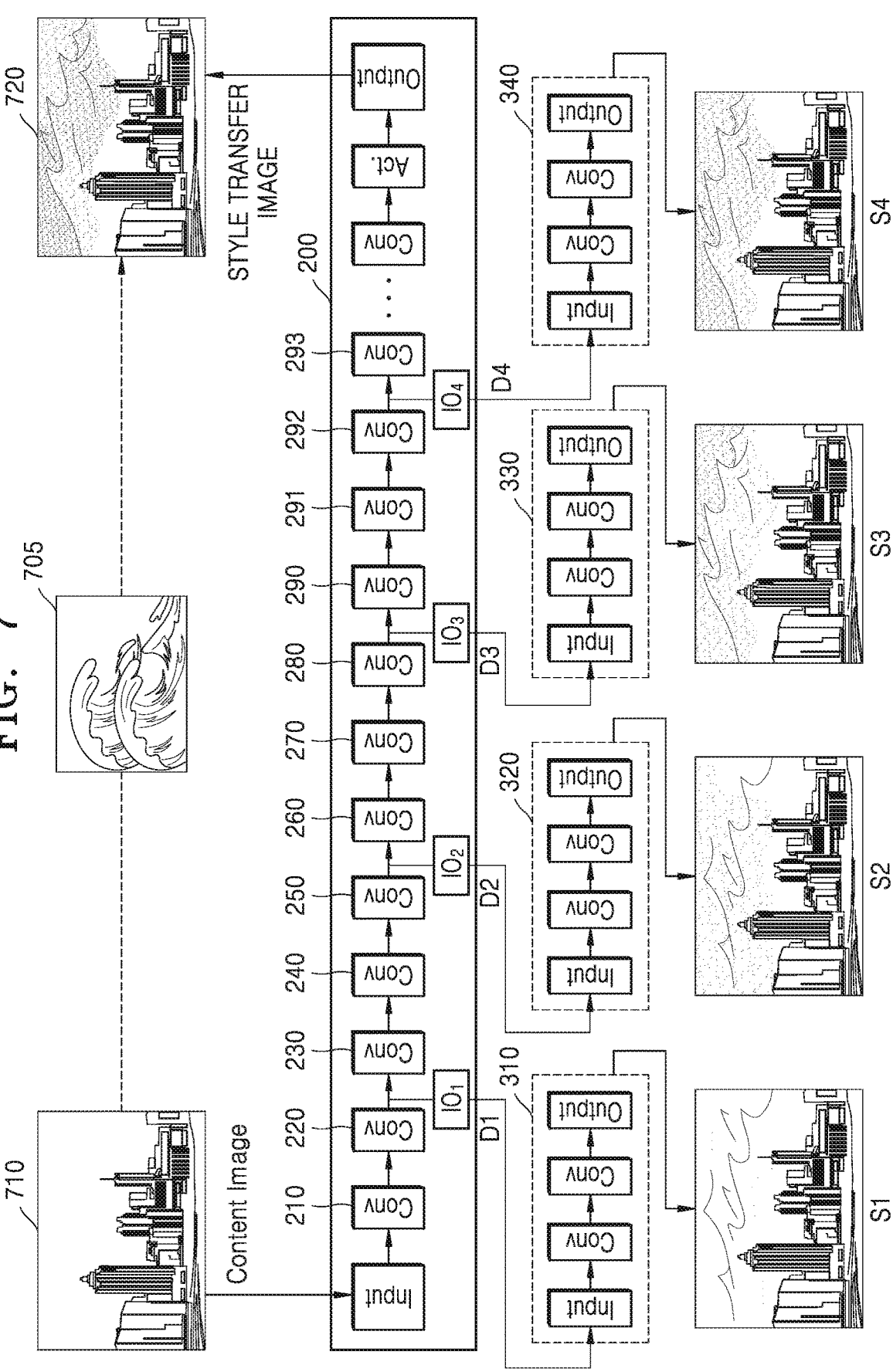
FIG. 7 is a diagram used to describe a method in which an image processing apparatus according to an embodiment of the disclosure operates.

FIG. 7 is a diagram used to describe a method in which an image processing apparatus operates according to an embodiment of the disclosure.

Referring to FIG. 7, the image processing apparatus 100 may generate a second image 720 from an input first image 710 by using the main neural network 200 trained for the purpose of style transfer. The main neural network 200 may be a CNN including N convolution layers, and the second image 720 may be an image obtained by applying a preset style 705 to the first image 710.

For example, the image processing apparatus 100 may input the first image 710 to the main neural network 200. The input first image 710 may include three channels (e.g., R, G, and B channels), but embodiments of the disclosure are not limited thereto.

The image processing apparatus 100 may perform an operation of convoluting input image data with one or more kernels within a first convolution layer 210. Data obtained via the convolution may be output by the first convolution layer 210 and input to a second convolution layer 220. According to the same method as described above, the image processing apparatus 100 may receive data from a previous convolution layer and perform an operation of convoluting the received data with one or more kernels or filters, within each of the N convolution layers, to thereby output data obtained via the convolution to a next convolution layer. The image processing apparatus 100 may perform an activation function operation on data having passed through the N convolution layers and may generate a final output image (e.g., the second image 720), based on data obtained via the activation function operation. The final output image may be an image including three channels (ft G, and B channels), but embodiments of the disclosure are not limited thereto.

The image processing apparatus 100 may obtain intermediate result data while processing the first image 710, by using the main neural network 200. The image processing apparatus 100 may obtain data having passed through up to an n-th convolution layer from among the convolution layers included in the main neural network 200.

For example, as shown in FIG. 7, the first image 710 may be input to the main neural network 200 and, while the first image 710 is passing through the first and second convolution layers 210 and 220, data convoluted with one or more kernels or filters may be output as first intermediate result data D1. The first image 710 may be input to the main neural network 200, and data obtained after the first image 710 passes through the first through fifth convolution layers 210, 220, 230, 240, and 250 may be output as second intermediate result data D2. The first image 710 may be input to the main neural network 200, and data obtained after the first image 710 passes through the first through eighth convolution layers 210, 220, 230, 240, 250, 260, 270, and 280 may be output as third intermediate result data D3. The first image 710 may be input to the main neural network 200, and data obtained after the first image 710 passes through first through eleventh convolution layers 210, 220, 230, 240, 250, 260, 270, 280, 290, 291, and 292 may be output as fourth intermediate result data D4. However, embodiments of the disclosure are not limited thereto.

The image processing apparatus 100 may generate intermediate output images different from the final output image 720 (i.e., the second image 720), by processing obtained intermediate result data by using a sub-neural network.

For example, the image processing apparatus 100 may include first through fourth sub-neural networks 310, 320, 330, and 340. The main neural network 200 may include a plurality of intermediate output layers that output the intermediate result data to the sub-neural networks 310, 320, 330, and 340. In particular, the main neural network 200 may include a first intermediate output layer $IO_1$ located between the second convolution layer 220 and the third convolution layer 230 to transfer the first intermediate result data D1 to the first sub-neural network 310, a second intermediate output layer $IO_2$ located between the fifth convolution layer 250 and the sixth convolution layer 260 to transfer the second intermediate result data D2 to the second sub-neural network 320, a third intermediate output layer $IO_3$ located between the eighth convolution layer 280 and the ninth convolution layer 290 to transfer the third intermediate result data D3 to the third sub-neural network 330, and a fourth intermediate output layer $IO_4$ located between the eleventh convolution layer 292 and the twelfth convolution layer 293 to transfer the fourth intermediate result data D4 to the fourth sub-neural network 340.

The image processing apparatus 100 may input the obtained first intermediate result data D1 to the first sub-neural network 310. The first sub-neural network 310 may include one or more convolution layers, and the one or more convolution layers may perform an operation of convoluting the input first intermediate result data D1 with one or more kernels or filters. The image processing apparatus 100 may perform an activation function operation on convoluted data and may generate a first intermediate output image S1, based on data obtained via the activation function operation. The first intermediate output image S1 may be an image including three channels (e.g., R, G, and B channels), but embodiments of the disclosure are not limited thereto.

The image processing apparatus 100 may generate second through fourth intermediate output images S2, S3, and S4 by processing the second through fourth intermediate result data D2, D3, and D4 by using the second through fourth sub-neural networks 320, 330, and 340, respectively. The second through fourth intermediate output images S2, S3, and S4 are generated according to the method of generating the first intermediate output image S1 by processing the first intermediate result data D1 by using the first sub-neural network 310, and thus a detailed description thereof will be omitted.

A degree to which a style is applied to obtain each of the first through fourth intermediate output images S1, S2, S3, and S4 may be less than that for the second image 720. For example, in a direction from the first intermediate output image S1 to the fourth intermediate output image S4, the degree to which the preset style 705 is applied to the first image 710 may increase. The degree to which the preset style 705 is applied to obtain the second image 720 (i.e., the final output image) may be greater than the degree to which the preset style 705 is applied to obtain the fourth intermediate output image S4.

Figure 8:
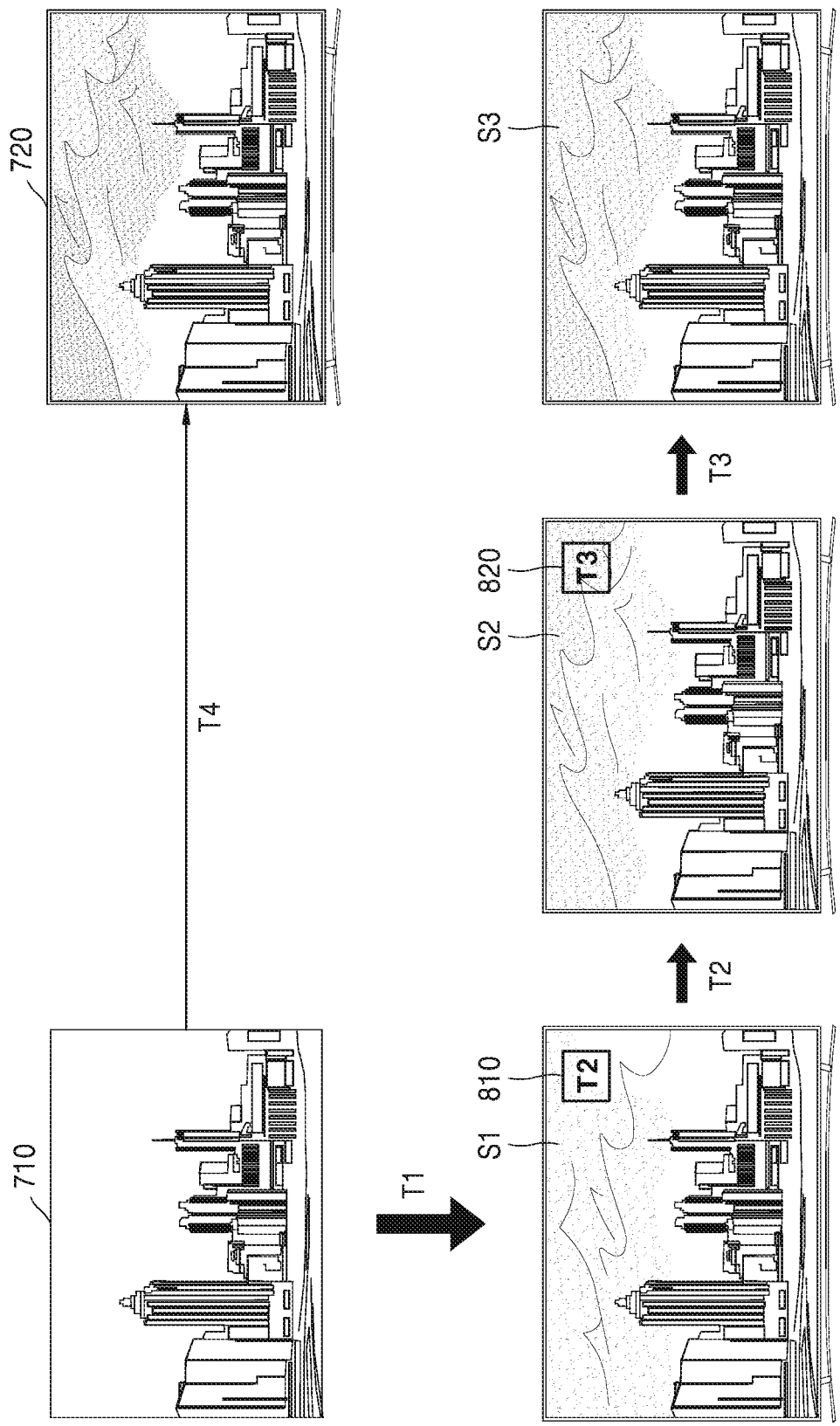
FIG. 8 illustrates an example in which an image processing apparatus according to an embodiment of the disclosure displays intermediate output images.
Figure 9:
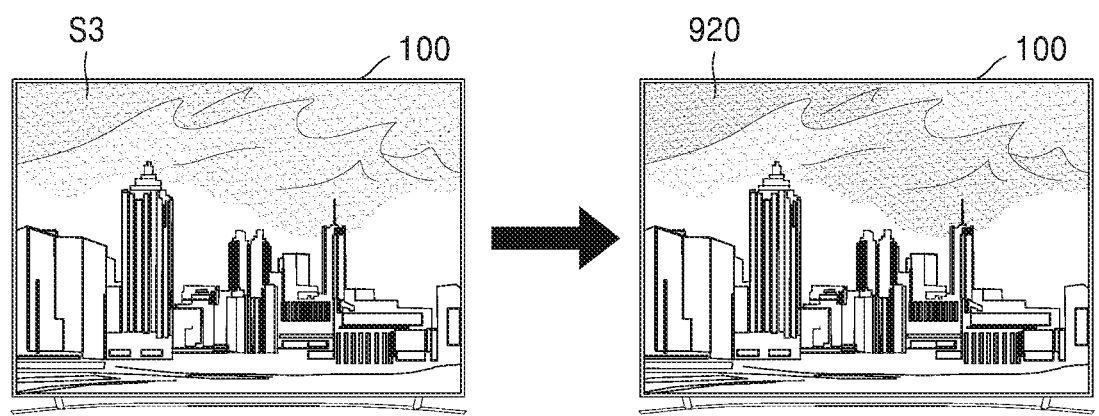
FIG. 9 illustrates an example in which an image processing apparatus according to an embodiment of the disclosure displays intermediate output images.

FIGS. 8 and 9 are views for illustrating an example in which an image processing apparatus according to an embodiment of the disclosure displays intermediate output images.

Referring to FIG. 8, a first time period T1 may be taken when the image processing apparatus 100 generates the first intermediate output image S1 from the first image 710 by using the main neural network 200 and the first sub-neural network 310. The image processing apparatus 100 may display the generated first intermediate output image S1 on a display. A second time period T1+T2 may be taken when the image processing apparatus 100 generates the second intermediate output image S2 from the first image 710 by using the main neural network 200 and the second sub-neural network 320, and a third time period T1+T2+T3 may be taken when the image processing apparatus 100 generates the third intermediate output image S3 from the first image 710 by using the main neural network 200 and the third sub-neural network 330.

When the image processing apparatus 100 generates the final output image 720 (i.e. the second image) from the first image 710 by using the main neural network 200, a fourth time period T4 may be taken. The fourth time period T4 may be longer than the third time period T1+T2+T3.

Before the image processing apparatus 100 generates the final output image 720 by processing the first image 710 by using the main neural network 200, the image processing apparatus 100 may generate the first through third intermediate output images S1, S2, and S3 and display them on the display.

The image processing apparatus 100 may display pieces of time information 810 and 820 each indicating a time period to be taken until a next output image will be generated, together with output images. For example, as illustrated in FIG. 8, while displaying the first intermediate output image S1, the image processing apparatus 100 may also display the time information 810 indicating the time period T2 to be taken from a current time point to a time point when the second intermediate output image S2 will be generated. While displaying the second intermediate output image S2, the image processing apparatus 100 may also display the time information 820 indicating the time period T3 to be taken until the third intermediate output image S3 will be generated.

The image processing apparatus 100 may display not only time information indicating a time period to be taken until a next intermediate output image will be generated, but also time information indicating a time period to be taken until a final output image will be generated.

Accordingly, a user may check the intermediate output images displayed on the display before the final output image is generated and may check a time period to be taken until a next output image will be generated, thereby determining whether to continuously perform image processing.

The image processing apparatus 100 may interrupt image processing with respect to the first image 710 in the main neural network 200, based on a user input. For example, when the third intermediate output image S3 is displayed and at this time an image processing interrupt request is received, the image processing apparatus 100 may interrupt image processing with respect to the first image 710 in the main neural network 200. Accordingly, the image processing apparatus 100 may not generate next intermediate output images and the final output image 720.

Referring to FIG. 9, the image processing apparatus 100 may perform additional image processing on an intermediate output image, based on a user input. For example, the image processing apparatus 100 may generate a final image 920 by performing image processing (sharpening) of adjusting the color sense, brightness, clearness, and the like of the third intermediate output image S3. However, embodiments of the disclosure are not limited thereto.

Figure 10:
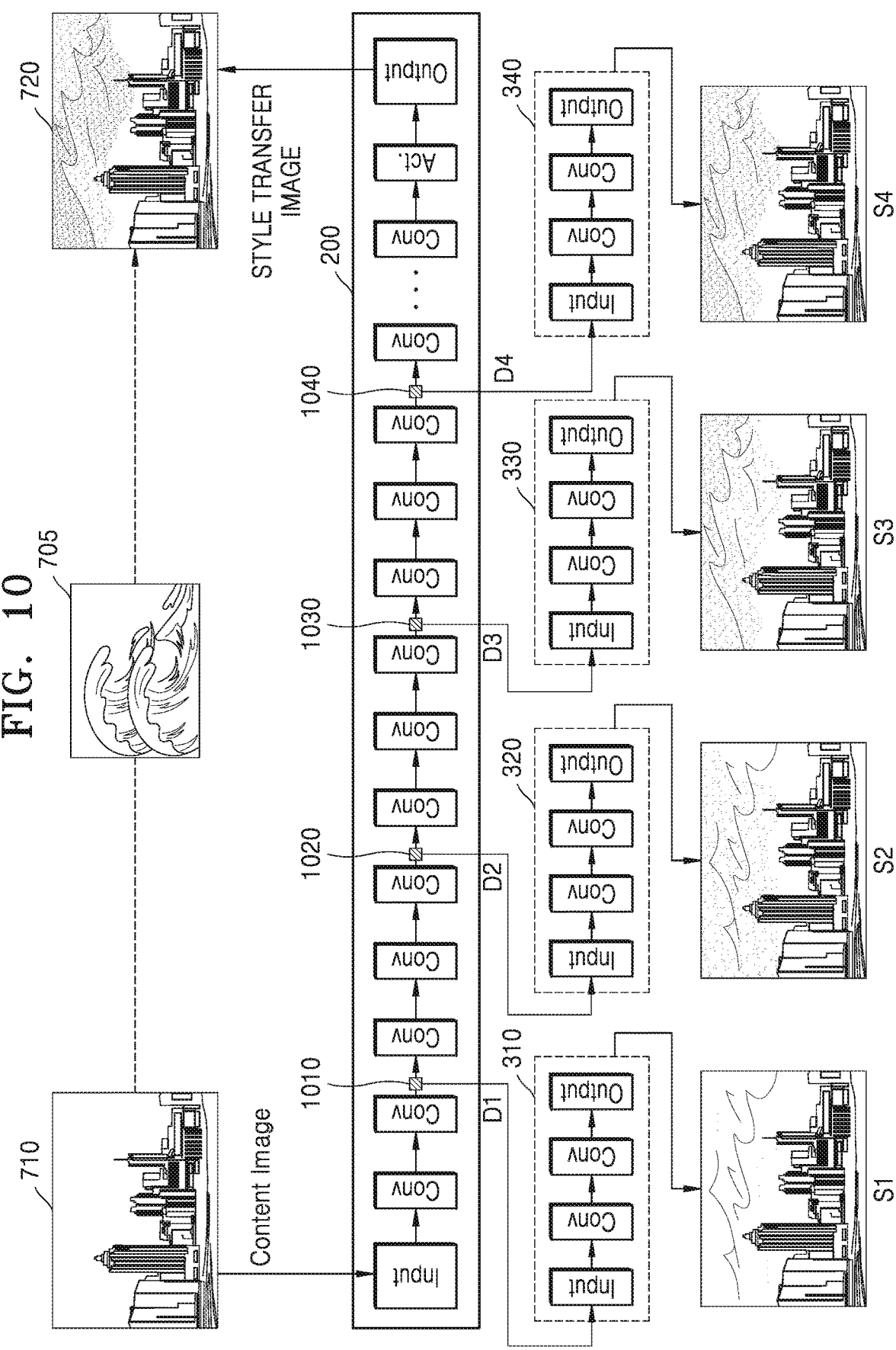
FIG. 10 illustrates a method in which an image processing apparatus according to an embodiment of the disclosure determines whether to enter a sub-neural network.

FIG. 10 illustrates a method, performed by the image processing apparatus 100, of determining whether to enter a sub-neural network.

Referring to FIG. 10, the image processing apparatus 100 may determine, as sub-network points, points in the main neural network 200 where pieces of intermediate are obtained. For example, the image processing apparatus 100 may determine, as a first sub-network point 1010, an output point of a second convolution layer where the first intermediate result data D1 is obtained (input point of a third convolution layer), determine, as a second sub-network point 1020, an output point of a fifth convolution layer where the second intermediate result data D2 is obtained (input point of a sixth convolution layer), determine, as a third sub-network point 1030, an output point of an eighth convolution layer where the third intermediate result data D3 is obtained (input point of a ninth convolution layer), and determine, as a fourth sub-network point 1040, an output point of an eleventh convolution layer where the fourth intermediate result data D4 is obtained (input point of a twelfth convolution layer). However, embodiments of the disclosure are not limited thereto.

The image processing apparatus 100 may determine whether to perform image processing by using a sub-neural network, at the first through fourth sub-network points 1010, 1020, 1030, and 1040. For example, when a convolution operation is completed in the first and second convolution layers and thus the first intermediate result data D1 is output (at the first sub-network point 1010), the image processing apparatus 100 may input the first intermediate result data D1 to the first sub-neural network 310 and perform image processing, thereby determining whether to generate the first intermediate output image S1.

The image processing apparatus 100 may calculate and estimate a time period (e.g., a first time period) to be taken to process the first intermediate result data D1 into the first intermediate output image S1 by using the first sub-neural network 310, and a time period (e.g., a second time period) to be taken to process the first intermediate result data D1 into the final output image 720 by using the main neural network 200. When a difference between the first and second time periods is equal to or greater than a preset value, the image processing apparatus 100 may enter the first sub-neural network 310. For example, the image processing apparatus 100 may generate the first intermediate output image S1 using the first intermediate result data D1 and the first sub-neural network 310. On the other hand, when the difference between the first and second time periods is less than the preset value, the image processing apparatus 100 may not enter the first sub-neural network 310. For example, without generating the first intermediate output image S1, the image processing apparatus 100 may generate the final output image 720 using the first intermediate result data D1 and the main neural network 200.

Likewise, the image processing apparatus 100 may calculate a time period (e.g., a third time period) to be taken to process the second intermediate result data D2 into the second intermediate output image S2 by using the second sub-neural network 320, and a time period (e.g., a fourth time period) to be taken to process the second intermediate result data D2 into the final output image 720 by using the main neural network 200. The image processing apparatus 100 may determine whether to enter the second sub-neural network 320, by comparing the third and fourth time periods with each other at the second sub-network point 1020.

The image processing apparatus 100 may also determine whether to enter the third sub-neural network 330, by comparing, at the third sub-network point 1030, a time period (e.g., a fifth time period) to be taken to process the third intermediate result data D3 into the third intermediate output image S3 by using the third sub-neural network 330 with a time period (e.g., a sixth time period) to be taken to process the third intermediate result data D3 into the final output image 720 by using the main neural network 200.

The image processing apparatus 100 may also determine whether to enter the fourth sub-neural network 340, by comparing, at the fourth sub-network point 1040, a time period (e.g., a seventh time period) to be taken to process the fourth intermediate result data D4 into the fourth intermediate output image S4 by using the fourth sub-neural network 340 with a time period (e.g., a eighth time period) to be taken to process the fourth intermediate result data D4 into the final output image 720 by using the main neural network 200.

Figure 11:
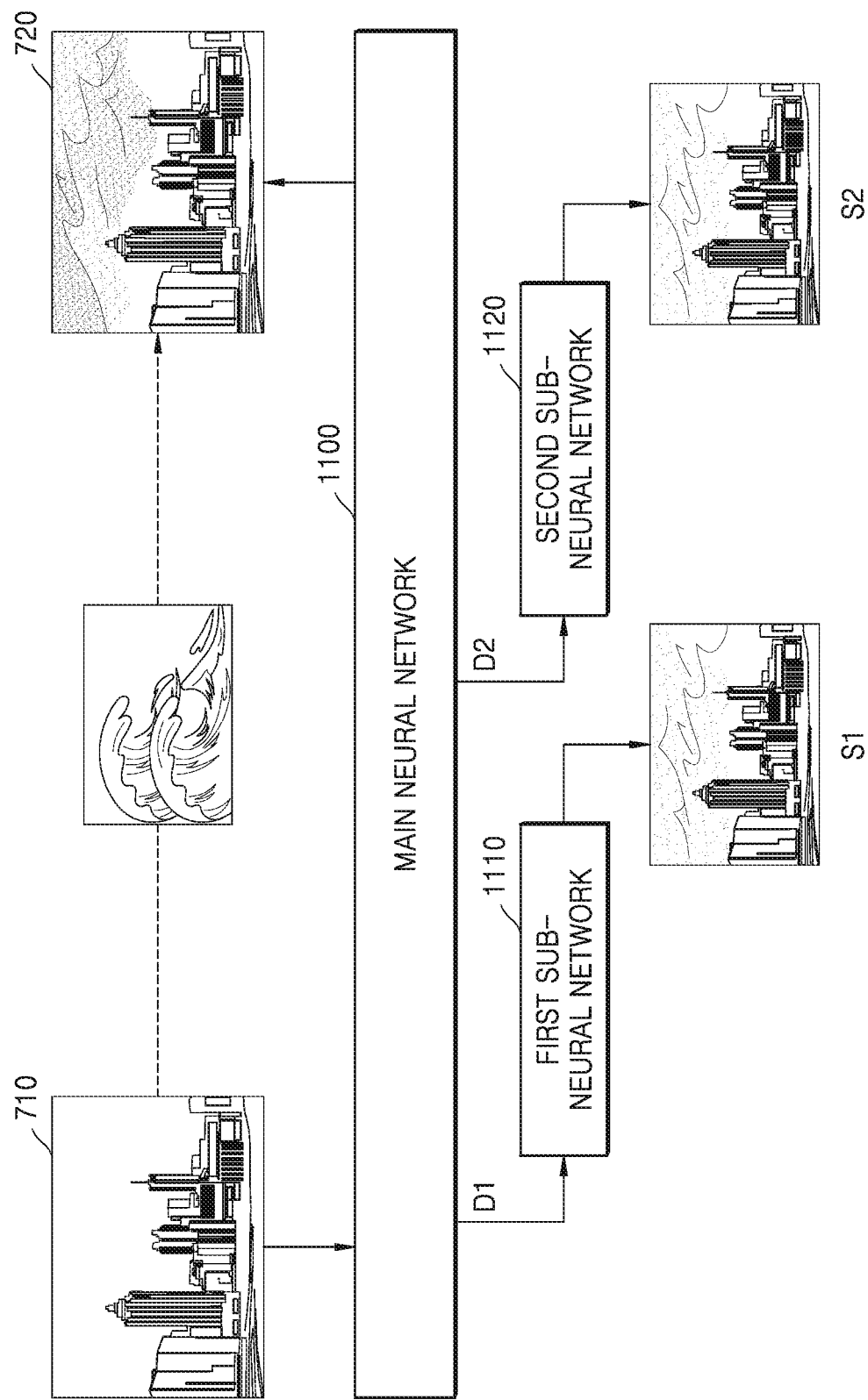
FIG. 11 is a diagram used to explain a method in which an image processing apparatus according to an embodiment of the disclosure generates output images by using a main neural network and sub-neural networks.

FIG. 11 is a diagram used to explain a method, performed by an image processing apparatus according to an embodiment of the disclosure, of generating output images by using a main neural network and sub-neural networks.

A main neural network 1100 of FIG. 11 may correspond to the main neural network 200 of FIG. 7, a first sub-neural network 1110 of FIG. 11 may correspond to the first sub-neural network 310 of FIG. 7, and a second sub-neural network 1120 of FIG. 11 may correspond to the second sub-neural network 320 of FIG. 7. Accordingly, detailed descriptions of structures and operations of the main neural network 1100 and the first and second sub-neural networks 1110 and 1120 will be omitted here.

Referring to FIG. 11, the image processing apparatus 100 may generate the second image 720 (i.e., the final output image) from the first image 710 by using the main neural network 1100.

The image processing apparatus 100 may obtain the first intermediate result data D1 by processing the first image 710 by using the main neural network 1100 and may generate the first intermediate output image S1 by using the first intermediate result data D1 and the first sub-neural network 1110. The image processing apparatus 100 may also obtain the second intermediate result data D2 by processing the first image 710 by using the main neural network 1100 and may generate the second intermediate output image S2 by using the second intermediate result data D2 and the second sub-neural network 1120.

The first image 710 and the second image 720 (i.e., the final output image) may be high-resolution images, and the first intermediate output image S1 and the second intermediate output image S2 may be low-resolution images.

Figure 12:
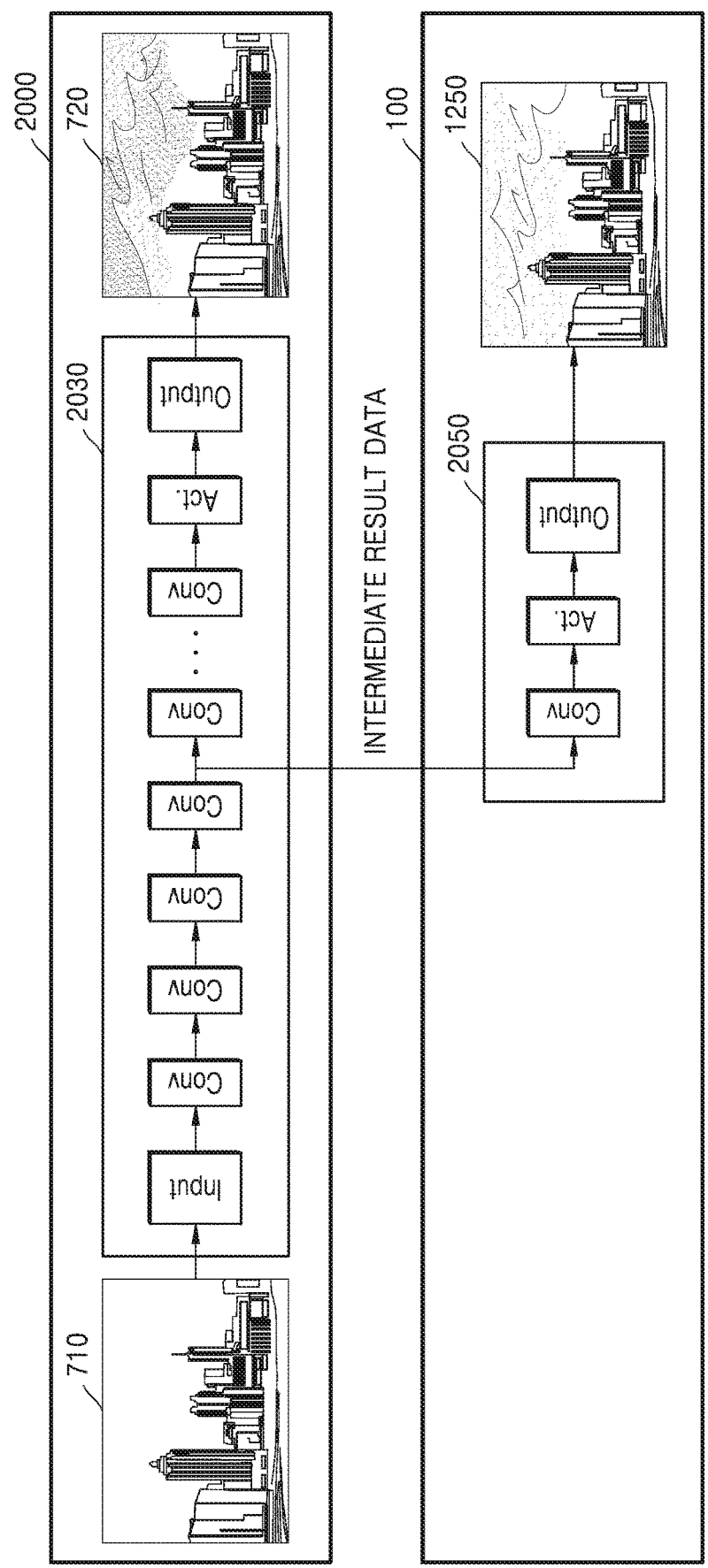
FIG. 12 is a diagram illustrating an example where an image processing apparatus according to an embodiment of the disclosure and a server interoperate with each other to perform image processing.

FIG. 12 is a diagram illustrating an example where an image processing apparatus according to an embodiment of the disclosure interoperates with a server.

Referring to FIG. 12, a server 2000 may include a main neural network 2030, and the main neural network 2030 may be a model trained to process an image according to a preset purpose. For example, the main neural network 2030 may be a model trained for the purpose of style transfer.

The server 2000 may generate the second image 720 (i.e., the final image, the style transferred image) by applying a preset style to the input first image 710 by using the main neural network 2030.

Because the main neural network 2030 of FIG. 12 may correspond to the main neural network 200 of FIG. 3, detailed descriptions of a structure and an operation of the main neural network 2030 will be omitted here. The server 2000 may transmit the second image 720 to the image processing apparatus 100.

The server 2000 may obtain intermediate result data while the first image 710 is being processed in the main neural network 2030. For example, the intermediate result data may include a feature map (e.g., feature information) extracted from a specific layer from among a plurality of convolution layers included in the main neural network 2030.

The server 2000 may transmit the intermediate result data to the image processing apparatus 100.

The image processing apparatus 100 may include a sub-neural network 2050. The sub-neural network 2050 may include one or more convolution layers, and a convolution operation may be performed in the one or more convolution layers. For example, the image processing apparatus 100 may input the intermediate result data received from the server 2000 to the sub-neural network 2050, and the intermediate result data may be convoluted with one or more kernels while passing through the one or more convolution layers. The image processing apparatus 100 may perform an activation function operation on convoluted data and may generate a third image 1250 (e.g., an intermediate output image), based on data obtained via the activation function operation.

The image processing apparatus 100 may display the second image 720 received from the server 2000 and the generated third image 1250 on the display. A degree to which a preset style is applied to the third image 1250 (e.g., the intermediate output image) may be less than a degree to which a preset style is applied to the second image 720 (e.g., the final output image).

As illustrated in FIG. 12, an operation of the main neural network 2030 is performed in the server 2000 and an operation of the sub-neural network 2050 is performed in the image processing apparatus 100, and thus a memory bandwidth of the image processing apparatus 100 and a time period taken to obtain an output image may be reduced.

Figure 13:
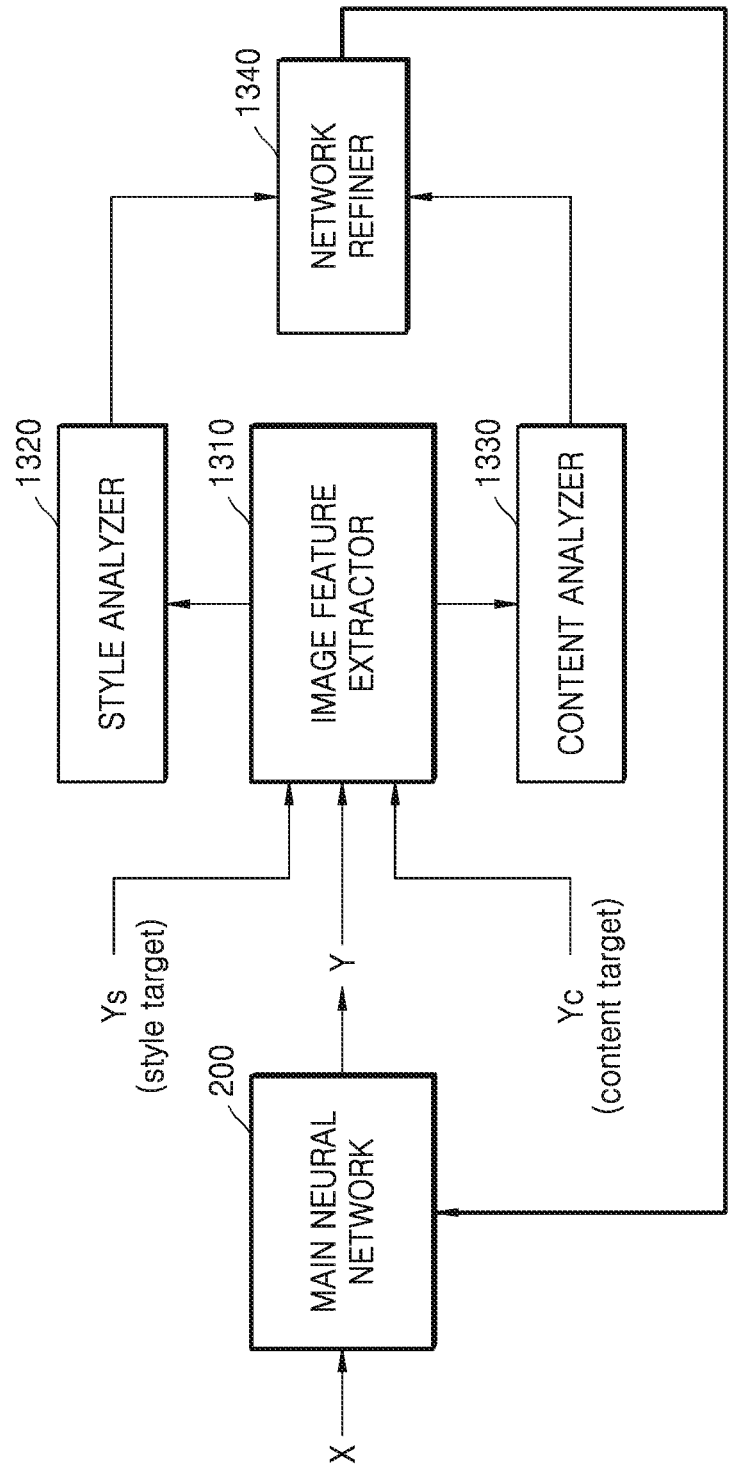
FIG. 13 is a block diagram used to explain a method of training a main neural network and a sub-neural network according to an embodiment of the disclosure.

FIG. 13 is a block diagram used to explain a method of training a main neural network and a sub-neural network, according to an embodiment of the disclosure.

Referring to FIG. 13, the image processing apparatus 100 may include an image feature extractor 1310, a style analyzer 1320, a content analyzer 1330, and a network refiner 1340. The image feature extractor 1310 may receive an image Y, a style target image Ys, and a content target image Yc from the main neural network 200. The style target image Ys may be an image including a style that is to be transferred, by using the main neural network 200. The content target image Yc, as an original image before a style is transferred, may be the same image as an image X that is input to the main neural network 200.

The image feature extractor 1310 may include a CNN and may extract feature maps (feature information) of the received style target image Ys, the received image Y, and the received content target image Yc by using the CNN. The CNN may include a plurality of convolution layers, and a convolution operation may be performed in the plurality of convolution layers. The image feature extractor 1310 may perform operations, such as an activation function and pooling, in addition to a convolution operation in the plurality of convolution layers, and may extract a feature map in each of the convolution layers. For example, the image feature extractor 1310 may extract a feature map of the style target image Ys, a feature map of the content target image Yc, and a feature map of the image Y in each of the convolution layers included in the image feature extractor 1310.

The image feature extractor 1310 may extract features of a low level, such as edges or gradients of an input image in anterior convolution layers, and may extract more gradually complicated feature maps in posterior convolution layers than the anterior convolution layers. However, embodiments of the disclosure are not limited thereto.

The image feature extractor 1310 may extract features of a low level, such as edges or gradients of an input image in anterior convolution layers, and may extract more gradually complicated feature maps in posterior convolution layers than the anterior convolution layers. However, embodiments of the disclosure are not limited thereto.

The style analyzer 1320 may analyze a difference between styles of the style target image Ys and the image Y. For example, the style analyzer 1320 may analyze a difference between the feature map of the style target image Ys and the feature map of the image Y.

The content analyzer 1330 may analyze a difference between content of the content target image Yc and content of the image Y. For example, the content analyzer 1330 may analyze a difference between the feature map of the content target image Yc and the feature map of the image Y.

The network refiner 1340 may adjust weights of the kernels of the main neural network 200 such that the difference between the feature map about the style target image and the feature map of the output image decreases. The network refiner 1340 may also adjust the weights of the kernels of the main neural network 200 such that the difference between the feature map about the content target image and the feature map of the output image decreases. However, embodiments of the disclosure are not limited thereto.

Although FIG. 13 illustrates and describes only a method of training the main neural network 200 according to an embodiment of the disclosure, a sub-neural network according to an embodiment of the disclosure may be trained using the same method as described above.

In particular, an image processing apparatus according to an embodiment of the disclosure may include neural networks outputting different results although partially processing images in a similar manner, as a main neural network and a sub-neural network. For example, one of a first neural network and a second neural network may be included as a main neural network, and only a portion of the other neural network that has different processing from the main neural network may be included as a sub-neural network. However, embodiments of the disclosure are not limited thereto. Accordingly, the image processing apparatus may increase the efficiency of neural network training by not repeating training with respect to the same processing.

Figure 14:
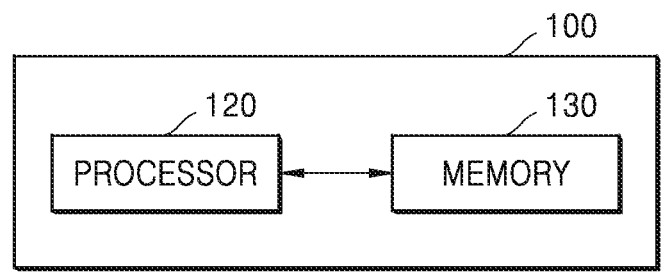
FIG. 14 is a block diagram of a structure of an image processing apparatus according to an embodiment of the disclosure.

FIG. 14 is a block diagram of a structure of an image processing apparatus according to an embodiment of the disclosure.

Referring to FIG. 14, the image processing apparatus 100 according to an embodiment of the disclosure may include a processor 120 and a memory 130.

The processor 120 may execute one or more programs stored in the memory 130. The processor 120 may include a single core, a dual core, a triple core, a quad core, or a multiple core thereof. The processor 120 may include a plurality of processors. For example, the processor 120 may be implemented by using a main processor and a sub-processor operating in a sleep mode.

The memory 130 may store various pieces of data, programs, or applications for driving and controlling the image processing apparatus 100.

A program stored in the memory 130 may include one or more instructions. A program (one or more instructions) or application stored in the memory 130 may be executed by the processor 120.

The processor 120 may execute one or more instructions stored in the memory 130 to thereby process a first image by using a main neural network. The main neural network may be a model trained to process an image according to a preset condition. The main neural network may be a CNN including a plurality of convolution layers. For example, the main neural network may be a model trained to output a style-transferred image by applying a preset style to an input image. Alternatively, the main neural network may be a model trained to transform an input low-resolution image into a high-resolution image and output the high-resolution image. However, embodiments of the disclosure are not limited thereto.

The processor 120 may process the first image by using the main neural network to obtain a final output image (e.g., a second image).

The processor 120 may obtain intermediate result data while processing the first image and process the obtained intermediate result data by using a sub-neural network. The processor 120 may obtain an intermediate output image (e.g., a third image) different from the final output image (e.g., the second image), by processing the intermediate result data by using the sub-neural network.

In particular, when the main neural network is a model trained to apply a preset style, a degree to which the preset style has been applied to obtain the final output image may be different from a degree to which the preset style has been applied to obtain the intermediate output image. For example, the degree to which the preset style has been applied to obtain the intermediate output image may be less than the degree to which the preset style has been applied to obtain the final output image. However, embodiments of the disclosure are not limited thereto.

The processor 120 may predict a time period (e.g., a first time period) taken to generate the intermediate output image from the first image (e.g., an input image) and a time period (e.g., a second time period) taken to generate the final output image from the first image (e.g., the input image). The processor 120 may determine whether to generate the intermediate output image, by using the sub-neural network, by comparing a difference between the predicted first and second time periods with a preset time.

The processor 120 may control a display to display a time period taken to generate the intermediate output image from a current moment or a time period taken to generate the final output image from the current moment.

The processor 120 may conclude processing of the first image by using the main neural network, before the final output image is generated, based on a user input. The processor 120 may allow the user to stop the processing of the first image through a user interface while providing the intermediate output image to the user. For example, when the intermediate output image is displayed and at this time an image processing interrupt request is received, the processor 120 may interrupt processing of the first image in the main neural network. Accordingly, the processor 120 may not generate next intermediate output image and the final output image.

Figure 15:
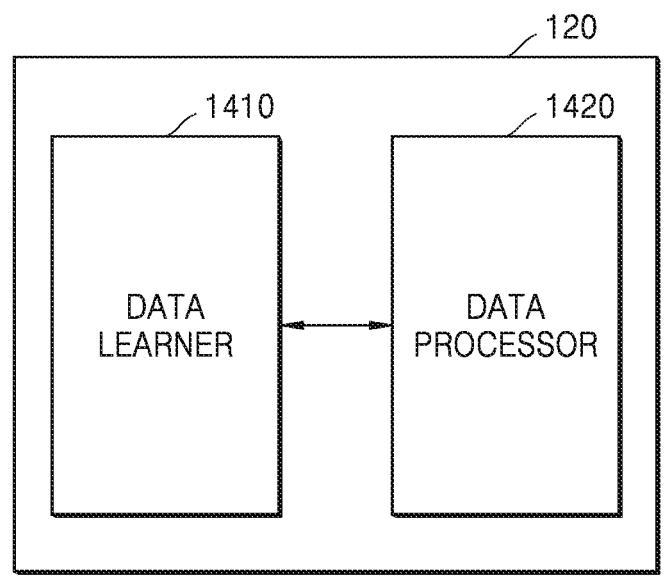
FIG. 15 is a block diagram of a processor according to an embodiment of the disclosure.

FIG. 15 is a block diagram of a processor 120 according to an embodiment of the disclosure.

Referring to FIG. 15, the processor 120 may include a data learner 1410 and a data processor 1420.

The data learner 1410 may learn a criterion of image processing according to a preset purpose in order to train the main neural network and the sub-neural network according to an embodiment of the disclosure. For example, the data learner 1410 may learn a criterion regarding what information (e.g., feature information) of an input image is used to apply a preset style to the input image.

The data learner 1410 may learn a criterion regarding how to apply a preset style, by using feature information of an image. The data learner 1410 may learn a criterion for applying the preset style to the input image, by obtaining data (e.g., an image) for use in learning and applying the obtained data to data processing models (a main neural network and a sub-neural network).

The data processing models (e.g., a main neural network and a sub-neural network) may be established considering, for example, an application field of a recognition model, a purpose of learning, or computer performance of a device. The data processing models may be, for example, models based on a neural network. For example, a model, such as a deep neural network (DNN), a recurrent neural network (RNN), or a bidirectional recurrent DNN (BRDNN), may be used as a data processing model, but embodiments of the disclosure are not limited thereto.

The data learner 1410 may train the data processing models by using a learning algorithm or the like including, for example, error back-propagation or gradient descent.

The data learner 1410 may train a data processing model through supervised learning by using, for example, learning data as an input value. The data learner 1410 may train the data processing model through unsupervised learning to find a criterion for data processing, by self-training a type of data necessary for data processing without supervision, for example. The data learner 1410 may train the data processing model through reinforcement learning using feedback about whether a result of the data processing according to training is right, for example.

When the data processing model is trained, the data learner 1410 may store the trained data processing model. In this case, the data learner 1410 may store the trained data processing models in a memory of an image processing apparatus. Alternatively, the data learner 1410 may store the trained data processing model in a memory of a server that is connected with the image processing apparatus via a wired or wireless network.

In particular, the memory that stores the trained data processing models may also store, for example, a command or data related to at least one other component of the image processing apparatus. The memory may also store software and/or a program. The program may include, for example, a kernel, middleware, an application programming interface (API), and/or an application program (or an application).

The data processor 1420 may input an image to a data processing model including a trained main neural network, and the data processing model may output, as a result value, an image processed according to a preset purpose. For example, the data processing model may output an image obtained by applying a preset style to an input image. The output result value (image) may be used to update a data processing model including a main neural network and a sub-neural network.

At least one of the data learner 1410 or the data processor 1420 may be manufactured in the form of at least one hardware chip and may be mounted on an image processing apparatus. For example, at least one of the data learner 1410 or the data processor 1420 may be manufactured in the form of a dedicated hardware chip for artificial intelligence (AI), or may be manufactured as a portion of an existing general-purpose processor (e.g., a central processing unit (CPU) or an application processor (AP)) or a processor dedicated to graphics e.g., a graphics processing unit (GPU)) and may be mounted on any of the aforementioned various image processing apparatuses.

The data learner 1410 and the data processor 1420 may be both mounted on a single image processing apparatus, or may be respectively mounted on independent image processing apparatuses. For example, one of the data learner 1410 and the data processor 1420 may be included in an image processing apparatus, and the other may be included in a server. The data learner 1410 and the data processor 1420 may be connected to each other by wire or wirelessly, and thus model information established by the data learner 1410 may be provided to the data processor 1420 and data input to the data processor 1420 may be provided as additional learning data to the data learner 1410.

At least one of the data learner 1410 or the data processor 1420 may be implemented as a software module. When at least one of the data learner 1410 or the data processor 1420 is implemented using a software module (or a program module including instructions), the software module may be stored in non-transitory computer-readable recording media. In this case, the at least one software module may be provided by an operating system (OS) or by a certain application. Alternatively, some of the at least one software module may be provided by an OS and the others may be provided by a certain application.

Figure 16:
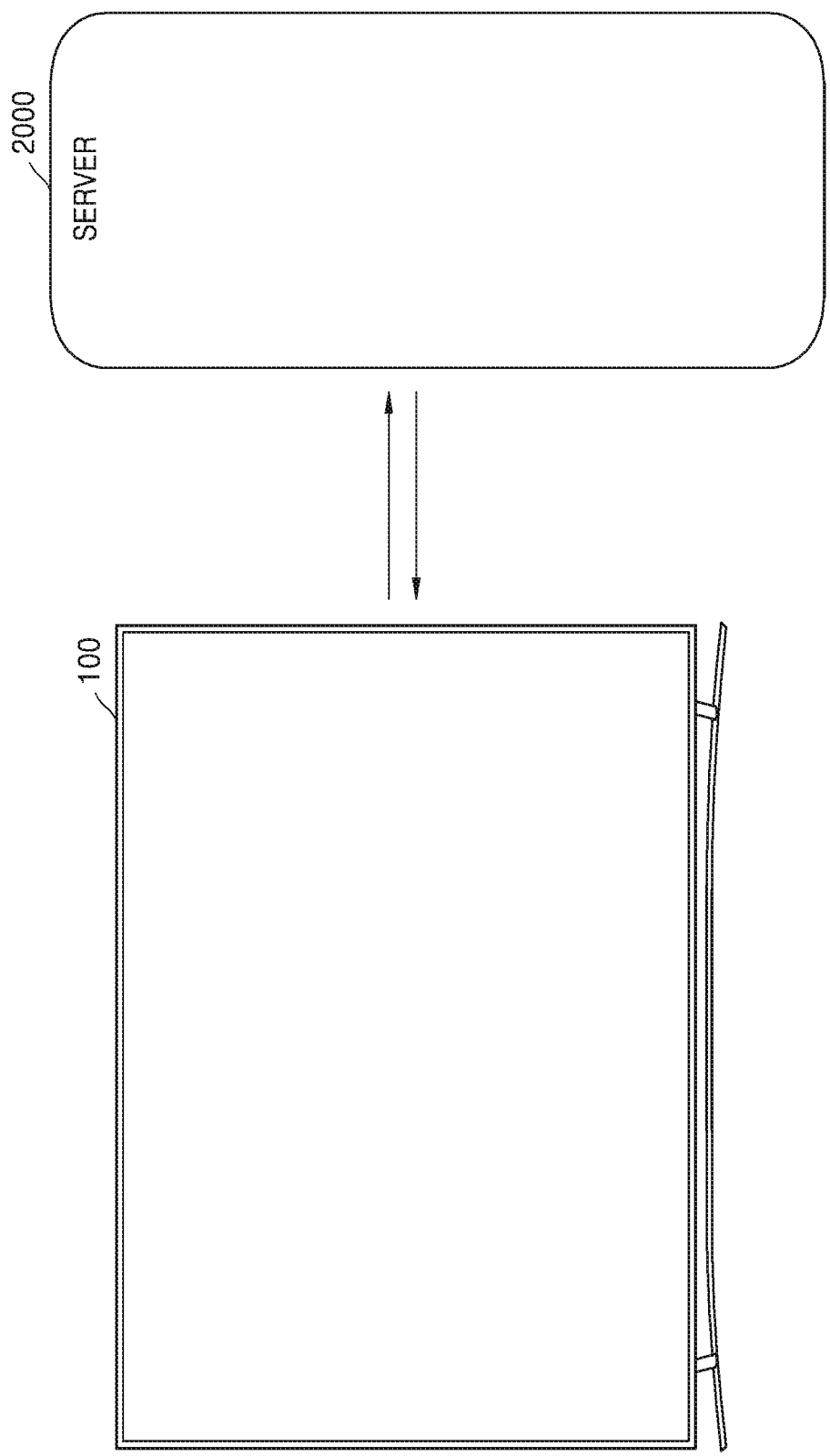
FIG. 16 is a diagram illustrating an example where an image processing apparatus according to an embodiment of the disclosure and a server interoperate with each other to train and recognize data.

FIG. 16 is a diagram illustrating an example where an image processing apparatus according to an embodiment of the disclosure and a server interoperate with each other to learn and recognize data.

Referring to FIG. 16, a server 2000 may train a main neural network and a sub-neural network by learning a criterion of image processing according to a preset purpose.

In this case, the server 2000 may perform a function of the data learner 1410 of FIG. 15. The server 2000 may learn a criterion regarding which learning data is to be used to process an input image according to a preset purpose. The server 2000 may learn a criterion for processing an image according to a preset purpose by using data.

The server 2000 may train at least one of the main neural network or the sub-neural network by using the learning data.

The image processing apparatus 100 may transmit data to the server 2000 and may request the server 2000 to process the data by applying the data to data processing models (a main neural network and a sub-neural network). For example, the server 2000 may process an image according to a preset purpose by using the data processing models (a main neural network and a sub-neural network). For example, the server 2000 may output a style-transferred image by applying a preset style to an input image.

Alternatively, the image processing apparatus 100 may receive the data processing models generated by the server 2000 from the server 2000, and may process the data by using the received data processing models. For example, the image processing apparatus 100 may process the image according to the preset purpose by using the received data processing models (a main neural network and a sub-neural network). For example, the image processing apparatus 100 may output a style-transferred image by applying the preset style to the input image.

Figure 17:
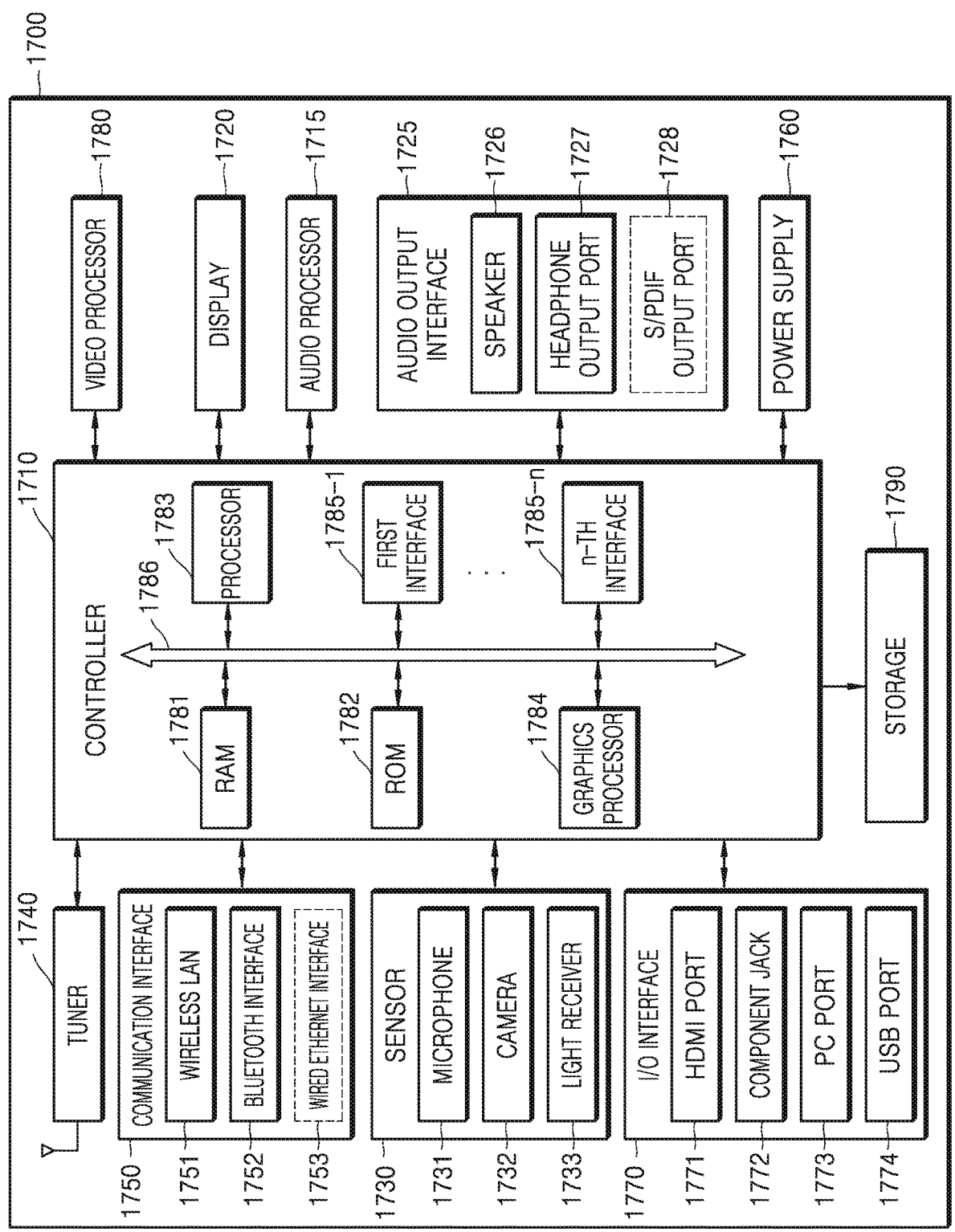
FIG. 17 is a block diagram of a structure of an image processing apparatus according to another embodiment of the disclosure.

FIG. 17 is a block diagram of a structure of an image processing apparatus 1700 according to another embodiment of the disclosure. The image processing apparatus 1700 of FIG. 17 may be an embodiment of the image processing apparatus 100 of FIG. 14.

Referring to FIG. 17, the image processing apparatus 1700 may include a tuner 1740, a controller 1710, a display 1720, a communication interface 1750, a sensor 1730, an input/output (I/O) interface 1770, a video processor 1780, an audio processor 1715, a storage 1790, and a power supply 1760.

The tuner 1740 may tune and select only a frequency of a channel which the image processing apparatus 1700 wants to receive from among many radio wave components that are obtained via amplification, mixing, resonance, or the like of a wired or wireless broadcasting signal. The broadcasting signal includes audio, video, and additional information (e.g., an electronic program guide (EPG)).

The tuner 1740 may receive a broadcasting signal in a frequency band corresponding to a channel number according to a user input (e.g., a control signal received from a control device, for example, a channel number input, a channel up-down input, and a channel input on an EPG screen image).

The tuner 1740 may receive a broadcasting signal from various sources, such as terrestrial broadcasting, cable broadcasting, satellite broadcasting, and Internet broadcasting. The tuner 1740 may also receive a broadcasting signal from a source such as analog broadcasting or digital broadcasting.

The communication interface 1750 may transmit or receive data or a signal to or from an external apparatus or a server under the control of the controller 1710. The controller 1710 may transmit/receive content to/from the external apparatus connected via the communication interface 1750, download an application from the external apparatus, or perform web-browsing. The communication interface 1750 may transmit or receive data or a signal according to at least one method from among a wireless local area network (LAN) 1751 (e.g., Wi-Fi), a Bluetooth network 1752, or a wired Ethernet network 1753 in correspondence to a performance and a structure of the image processing apparatus 1700.

The video processor 1780 processes video data that is received by the image processing apparatus 1700. The video processor 1780 may perform a variety of image processing, such as decoding, scaling, noise filtering, frame rate transformation, and resolution transformation, on the received video data.

The sensor 1730 senses a voice of a user, an image of the user, or an interaction with the user, and may include a microphone 1731, a camera 1732, and a light receiver 1733.

The microphone 1731 receives an uttered voice of the user. The microphone 1731 may transform the received voice into an electrical signal and output the electrical signal to the controller 1710. The user voice may include, for example, a voice corresponding to a menu or function of the image processing apparatus 1700.

The camera 1732 may receive an image (e.g., consecutive frames) corresponding to a motion of the user including a gesture within a recognition range of the camera 1732. The controller 1710 may select a menu that is displayed on the image processing apparatus 1700 by using a result of the recognition of the received motion, or perform control corresponding to the result of the motion recognition.

The light receiver 1733 receives an optical signal (including a control signal) from an external control device via a light window or the like of the bezel of the display 1720. The light receiver 1733 may receive an optical signal corresponding to a user input (e.g., touch, pressing, a touch gesture, a voice, or a motion) from the control device. A control signal may be extracted from the received optical signal under the control of the controller 1710.

The I/O interface 1770 receives video (e.g. a moving picture), audio (e.g., a voice or music), and additional information (e.g., an EPG) from outside the image processing apparatus 1700 under the control of the controller 1710. The I/O interface 1770 may include a High-Definition Multimedia Interface (HDMI) port 1771, a component jack 1772, a PC port 1773, or a USB port 1774. The I/O interface 1770 may include a combination of the HDMI port 1771, the component jack 1772, the PC port 1773, and the USB port 1774.

The controller 1710 controls an overall operation of the image processing apparatus 1700 and signal transfer among the internal components of the image processing apparatus 1700 and processes data. When there is an input of a user or stored preset conditions are satisfied, the controller 1710 may execute an OS and various applications that are stored in the storage 1790.

The controller 1710 may include random-access memory (RAM) 1781 that stores a signal or data input by an external source of the image processing apparatus 1700 or is used as a memory area for various operations performed by the image processing apparatus 1700, read-only memory (ROM) 1782 that stores a control program for controlling the image processing apparatus 1700, and a processor 1783.

A graphics processor 1784 generates a screen image including various objects, such as an icon, an image, and a text, by using an arithmetic unit and a rendering unit. The arithmetic unit calculates attribute values, such as a coordinate value, a shape, a size, a color, and the like, with which each object is to be displayed according to layouts of the screen image, based on the user interaction sensed by the sensor 1730. The rendering unit generates screen images of various layouts including objects, based on the attribute values calculated by the arithmetic unit. The screen images generated by the rendering unit are displayed on a display area of the display 1720.

First through n-th interfaces 1785-1 through 1785-$n$ are connected to the above-described components of the image processing apparatus 1700. One of the first through n-th interfaces 1285-1 through 1285-$n$ may be a network interface that is connected to an external apparatus via a network.

The RAM 1781, the ROM 1782, the processor 1783, the graphics processor 1784, and the first through n-th interfaces 1785-1 through 1785-$n$ may be connected to each other via an internal bus 1786.

The term "a controller of an image processing apparatus" used in the present embodiment of the disclosure includes the processor 1783, the ROM 1782, and the RAM 1781.

The display 1720 may generate a driving signal by converting an image signal, a data signal, an on-screen display (OSD) signal, and a control signal that are processed by the controller 1710. The display 1720 may be a plasma display panel (PDP), a liquid-crystal display (LCD), an organic light-emitting device (OLED), a flexible display, or a 3-dimensional (3D) display. The display 1720 may be configured as a touch screen, and thus may serve as an input device as well as an output device.

The audio processor 1715 processes audio data. The audio processor 1715 may perform a variety of processing, such as decoding, amplification, or noise filtering, on the audio data. The audio processor 1715 may include a plurality of audio processing modules to process audios corresponding to a plurality of pieces of content.

The audio output interface 1725 outputs audio included in a broadcasting signal received via the tuner 1740, under the control of the controller 1710. The audio output interface 1725 may also output audio (e.g., a voice or a sound) that is input via the communication interface 1750 or the I/O interface 1770. The audio output interface 1725 may also output audio stored in the storage 1790 under the control of the controller 1710. The audio output interface 1725 may include at least one selected from a speaker 1726, a headphone output port 1727, and a Sony/Philips Digital Interface (S/PDIF) output port 1728. The audio output interface 1725 may include a combination of the speaker 1726, the headphone output port 1727, and the S/PDIF output port 1728.

The power supply 1760 supplies power that is input from an external power source, to the internal components of the image processing apparatus 1700, under the control of the controller 1710. The power supply 1760 may also supply power that is output by one or more batteries located in the image processing apparatus 1700, to the internal components of the image processing apparatus 1700, under the control of the controller 1710.

The storage 1790 may store various data, programs, or applications for driving and controlling the image processing apparatus 1700 under the control of the controller 1710. The storage 1790 may include a broadcasting receiving module, a channel control module, a volume control module, a communication control module, a voice recognition module, a motion recognition module, a light receiving module, a display control module, an audio control module, an external input control module, a power control module, a power control module of a wirelessly (e.g., Bluetooth) connected external apparatus, a voice database (DB), or a motion DB. These modules and the DBs of the storage 1790 may be implemented as software in order to perform a broadcasting reception control function of the image processing apparatus 1700, a channel control function, a volume control function thereof, a communication control function thereof, a voice recognition function thereof, a motion recognition function thereof, a light receiving control function thereof, a display control function thereof, an audio control function thereof, an external input control function thereof, a power control function thereof, or a power control function of the wirelessly (e.g., Bluetooth) connected external apparatus. The controller 1710 may perform these functions by using the software stored in the storage 1790.

The block diagrams of the image processing apparatuses 100 and 1700 shown in FIGS. 14 and 17 are only exemplary embodiments of the disclosure. Components illustrated in FIGS. 14 and 17 may be combined or omitted according to the specifications of the image processing apparatuses 100 and 1700 when being actually implemented, or additional components may be included in the block diagrams of FIGS. 14 and 17. In other words, two or more components may be combined into a single component, or a single component may be divided into two or more components. A function performed in each block is merely an example to explain embodiments of the disclosure, and a detailed operation or device of each block does not limit the scope of the embodiments of the disclosure.

A method of operating an image processing apparatus, according to an embodiment of the disclosure, may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the disclosure or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

Also, an image processing apparatus or a method of operating the image processing apparatus according to the disclosed embodiments may be provided in a computer program product. The computer program product may be traded as a commodity between a seller and a purchaser.

The computer program product may include a software program and a computer-readable storage medium having the software program stored thereon. For example, the computer program product may include a product in the form of a software program (e.g., a downloadable app) that is electronically distributed through the manufacturer of an electronic device or an electronic market (e.g., Google Play Store, AppStore). For electronic distribution, at least a portion of the software program may be stored on a storage medium or may be created temporarily. In this case, the storage medium may be a server of a manufacturer, a server of an electronic market, or a storage medium of a relay server for temporarily storing an SW program.

The computer program product may include, in a system including a server and a client device, a storage medium of the server or a storage medium of the client device. Alternatively, when there is a third device (e.g., a smartphone) in communication with the server or client device, the computer program product may include a storage medium of the third device. Alternatively, the computer program product may include the S/W program itself transmitted from the server to the client device or the third device, or transmitted from the third device to the client device.

In this case, one of the server, the client device, and the third device may execute the computer program product to perform the methods according to the disclosed embodiments. Alternatively, at least two of the server, the client device, and the third device may execute the computer program product to distribute and perform the methods according to the disclosed embodiments.

For example, a server (e.g., a cloud server or an artificial intelligence server) may execute a computer program product stored on a server to control a client device communicating with the server to perform the methods according to the disclosed embodiments.

An image processing apparatus according to an embodiment of the disclosure may generate an intermediate output image by using a sub-neural network before generating a final output image in a main neural network, and thus a standby time from the viewpoint of a user may be reduced.

The image processing apparatus may generate the intermediate output image, and the user may determine whether to generate the final output image in the main neural network, based on the intermediate output image.

The image processing apparatus may include neural networks outputting different results although partially processing images similarly to each other, as a main neural network and a sub-neural network, thereby increasing the efficiency of neural network training.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image processing apparatus comprising:
a memory storing one or more instructions, and data structures for a main neural network and a sub-neural network, the main neural network comprising an input layer, an output layer, and a plurality of hidden layers between the input layer and the output layer; and
a processor configured to execute the one or more instructions stored in the memory, to:
process an input image by the main neural network to obtain intermediate result data, and
process, by the sub-neural network, the intermediate result data that is output from one of the plurality of hidden layers of the main neural network, to output an intermediate image while the input image is being processed by the main neural network to obtain a final output image.

2. The image processing apparatus of claim 1, wherein the main neural network comprises a plurality of first convolution layers as the plurality of hidden layers, and
the processor is further configured to perform a first convolution operation on the input image by using one or more kernels within the plurality of first convolution layers to extract feature information and output the intermediate result data based on the extracted feature information.

3. The image processing apparatus of claim 1, wherein the sub-neural network comprises one or more second convolution layers, and
the processor is further configured to perform a second convolution operation by applying one or more kernels to the intermediate result data within the one or more second convolution layers to extract feature information and generate the intermediate image based on the extracted feature information.

4. The image processing apparatus of claim 1, wherein the processor is further configured to process the input image by using the main neural network to obtain the final output image.

5. An image processing apparatus comprising:
a memory storing one or more instructions, and data structures for a main neural network and a sub-neural network; and
a processor configured to execute the one or more instructions stored in the memory, to:
process an input image by using the main neural network to obtain intermediate result data and obtain a final output image; and
process the intermediate result data by using the sub-neural network to output an intermediate image while the input image is being processed by using the main neural network,
wherein the main neural network is a network trained to generate the final output image by applying a preset style to the input image, and a degree to which the preset style has been applied to the intermediate image is less than a degree to which the preset style has been applied to the final output image.

6. An image processing apparatus comprising:
a memory storing one or more instructions, and data structures for a main neural network and a sub-neural network; and
a processor configured to execute the one or more instructions stored in the memory, to:
process an input image by using the main neural network to obtain intermediate result data and obtain a final output image; and
process the intermediate result data by using the sub-neural network to output an intermediate image while the input image is being processed by using the main neural network,
wherein a first time period taken to generate the final output image from the input image by using the main neural network is greater than a second time period taken to generate the intermediate image from the input image by using the sub-neural network.

7. The image processing apparatus of claim 6, wherein the processor is further configured to predict the first time period and the second time period and determine whether to generate the intermediate image by using the sub-neural network, based on the predicted first time period and the predicted second time period.

8. The image processing apparatus of claim 4, further comprising a display, wherein the processor is further configured to control the display to display a time period taken to generate at least one of the intermediate image or the final output image from a current time point.

9. The image processing apparatus of claim 4, wherein the processor is further configured to stop processing of the input image before the final output image is generated, based on a user input.

10. An image processing apparatus comprising:
a communication interface configured to receive intermediate result data from a server comprising a main neural network while the server is processing an input image by using the main neural network to obtain a final output image, the main neural network comprising an input layer, an output layer, and a plurality of hidden layers between the input layer and the output layer;
a memory storing one or more instructions and a data structure for a sub-neural network; and
a processor configured to execute the one or more instructions stored in the memory to obtain the intermediate result data from one of the plurality of hidden layers of the main neural network, and process the intermediate result data by the sub-neural network, to output an intermediate image while the input image is being processed by the main neural network of the server to obtain the final output image.

11. The image processing apparatus of claim 10, wherein the communication interface is further configured to receive the final output image obtained by processing the input image by using the main neural network.

12. A method of operating an image processing apparatus, the method comprising:
processing an input image by a main neural network that comprises an input layer, an output layer, and a plurality of hidden layers between the input layer and the output layer;
obtaining intermediate result data from the input image by using the main neural network while processing the input image to obtain a final output image; and generating an intermediate image by a sub-neural network based on the intermediate result data that is output from one of the plurality of hidden layers of the main neural network, while the input image is being processed by the main neural network to obtain the final output image.

13. The method of claim 12, wherein
the main neural network comprises a plurality of first convolution layers as the plurality of hidden layers,
the processing the input image by using the main neural network comprises extracting feature information by performing a first convolution operation on the input image and one or more kernels in the plurality of first convolution layers, and
the obtaining the intermediate result data comprises generating the intermediate result data, based on the extracted feature information.

14. The method of claim 12, wherein
the sub-neural network comprises one or more second convolution layers, and
the generating the intermediate image comprises:
extracting feature information by performing a second convolution operation by applying the intermediate result data to one or more kernels in the one or more second convolution layers; and
generating the intermediate image, based on the extracted feature information.

15. The method of claim 12, further comprising generating the final output image by processing the input image by using the main neural network.

16. A method of operating an image processing apparatus, the method comprising:
processing an input image by using a main neural network;
obtaining intermediate result data from the input image by using the main neural network while processing the input image to obtain a final output image;
generating the final output image by processing the input image by using the main neural network; and
generating an intermediate image based on the intermediate result data by using a sub-neural network,
wherein the main neural network is a network trained to generate the final output image by applying a preset style to the input image, and a degree to which the preset style has been applied to the intermediate image is less than a degree to which the preset style has been applied to the final output image.

17. A method of operating an image processing apparatus, the method comprising:
processing an input image by using a main neural network;
obtaining intermediate result data from the input image by using the main neural network while processing the input image to obtain a final output image;
generating the final output image by processing the input image by using the main neural network; and
generating an intermediate image based on the intermediate result data by using a sub-neural network,
wherein a first time period taken to generate the final output image from the input image by using the main neural network is greater than a second time period taken to generate the intermediate image from the input image by using the sub-neural network.

18. The method of claim 17, further comprising:
predicting the first time period and the second time period; and
determining whether to generate the intermediate image by using the sub-neural network, based on the predicted first time period and the predicted second time period.

19. The method of claim 15, further comprising displaying, on a display, a time period taken to generate at least one of the intermediate image or the final output image from a current time point.

20. The method of claim 15, further comprising stopping the main neural network from processing the input image, before the final output image is generated, based on a user input.

21. A computer program product including a non-transitory computer-readable recording medium having recorded thereon a computer program, which, when executed by a computer, performs the method of claim 12.

* * * * *